(12) United States Patent
Hegener et al.

(10) Patent No.: US 8,561,325 B1
(45) Date of Patent: Oct. 22, 2013

(54) GRUBBING ATTACHMENT

(75) Inventors: Spence Hegener, Boerne, TX (US); Zeb O. Warner, Lampasas, TX (US)

(73) Assignee: H&W Attachments, LLC, Boerne, TX (US)

( * ) Notice: Subject to any disclaimer, the term of this patent is extended or adjusted under 35 U.S.C. 154(b) by 131 days.

(21) Appl. No.: 13/234,866

(22) Filed: Sep. 16, 2011

Related U.S. Application Data

(60) Provisional application No. 61/383,581, filed on Sep. 16, 2010.

(51) Int. Cl.
*A01G 23/06* (2006.01)
*A01B 1/16* (2006.01)

(52) U.S. Cl.
USPC .............................. 37/301; 37/302; 254/132

(58) Field of Classification Search
USPC ......... 37/301–303, 404, 407, 468; 144/24.12, 144/324; 172/698–700, 720, 725; 254/132
See application file for complete search history.

(56) References Cited

U.S. PATENT DOCUMENTS

| | | | |
|---|---|---|---|
| 2,505,923 A | 5/1950 | Taylor et al. | |
| 2,535,054 A | 12/1950 | Ernst et al. | |
| 2,535,099 A | 12/1950 | Slick | |
| 2,650,063 A * | 8/1953 | Hawkins | 254/132 |
| 2,663,952 A * | 12/1953 | Winget | 37/302 |
| 3,057,599 A | 10/1962 | Clatterbuck | |
| 3,140,786 A | 7/1964 | J.C. Clatterbuck | |
| 3,219,215 A | 11/1965 | Gunnlaugson | |
| 3,344,540 A | 10/1967 | Ulrich | |
| 3,359,033 A | 12/1967 | Curtis | |
| 3,439,818 A | 4/1969 | O'Neil | |
| 3,659,635 A * | 5/1972 | Mellgren | 83/84 |
| 4,071,155 A | 1/1978 | Hart et al. | |
| 4,254,608 A | 3/1981 | Friday | |
| 4,356,644 A | 11/1982 | Harkness | |
| 4,452,479 A | 6/1984 | Terai et al. | |
| 4,466,491 A * | 8/1984 | Tower | 172/459 |
| 4,808,062 A | 2/1989 | Bare | |
| 4,951,922 A | 8/1990 | Brown, II | |
| 4,993,914 A | 2/1991 | Riddle | |
| 5,061,150 A | 10/1991 | Rentschler | |
| 5,067,261 A * | 11/1991 | Betts | 37/302 |
| 5,123,185 A | 6/1992 | Pollard | |
| 5,209,536 A | 5/1993 | Rogers, Sr. et al. | |
| 5,211,374 A | 5/1993 | Head et al. | |
| 5,465,770 A * | 11/1995 | Lansberry | 144/336 |
| 5,490,340 A | 2/1996 | Muncy | |
| 5,503,201 A | 4/1996 | Strickland et al. | |
| 5,516,250 A | 5/1996 | Sawyer | |
| 5,526,637 A | 6/1996 | Leonard | |
| 5,564,887 A | 10/1996 | Brooks | |
| 5,584,646 A | 12/1996 | Lewis et al. | |
| 5,788,300 A | 8/1998 | Dickison et al. | |

(Continued)

OTHER PUBLICATIONS

"Brush Clearing Equipment and Excavators," Cimarron Enterprises, Inc., www.cimarroninc.net, printed Sep. 6, 2010 (2 pages).

(Continued)

*Primary Examiner* — Alicia Torres
(74) *Attorney, Agent, or Firm* — Cox Smith Matthews Incorporated

(57) ABSTRACT

A skidsteer loader grubbing attachment capable of removing vegetation by engaging the vegetation below and above ground. The grubbing attachment may include a frame, a pincer mounted to the frame, and a blade attached to the frame below the pincer.

7 Claims, 27 Drawing Sheets

(56) References Cited

U.S. PATENT DOCUMENTS

| | | |
|---|---|---|
| 5,890,754 A | 4/1999 | Murr |
| 5,975,604 A | 11/1999 | Wolin et al. |
| 6,010,294 A | 1/2000 | Lyddon |
| 6,401,369 B1 | 6/2002 | Turner |
| 6,662,479 B2 | 12/2003 | Chaney |
| 6,763,618 B1 | 7/2004 | Moran |
| D552,630 S | 10/2007 | Garrison et al. |
| 2002/0104237 A1 | 8/2002 | Chaney |

OTHER PUBLICATIONS

"Skidsteer, Excavator & Tractor Attachments," Everything Attachments.com, http://www.everythingattachments.com/ Construction-Attachments-Stump-Grapple-Bucket-p/cal-grapple-wickstumpsxd.htm (3 pages), Mar. 5, 2010.

* cited by examiner

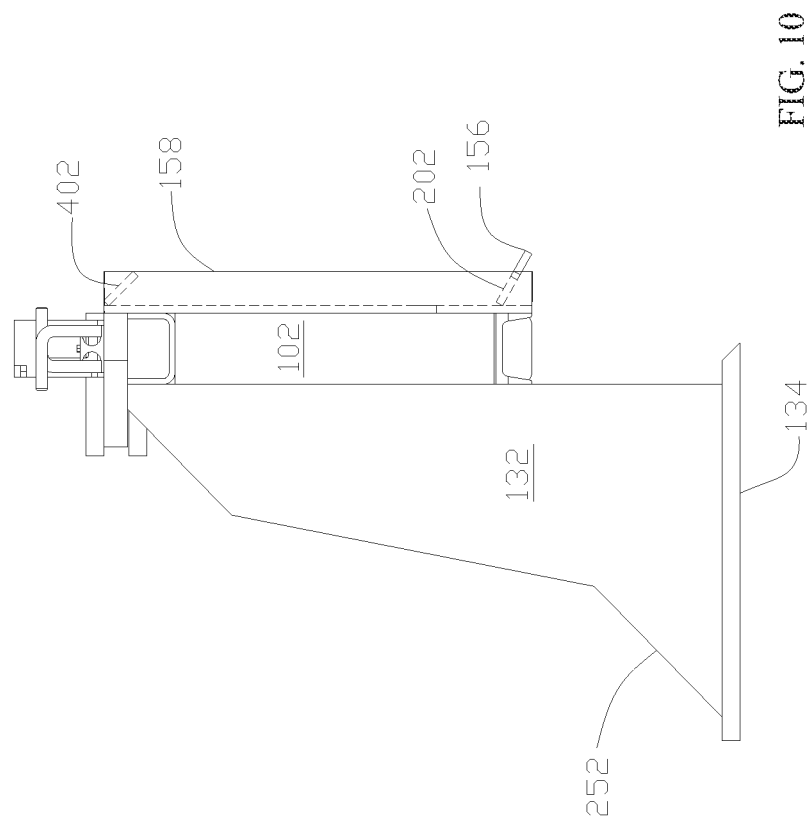

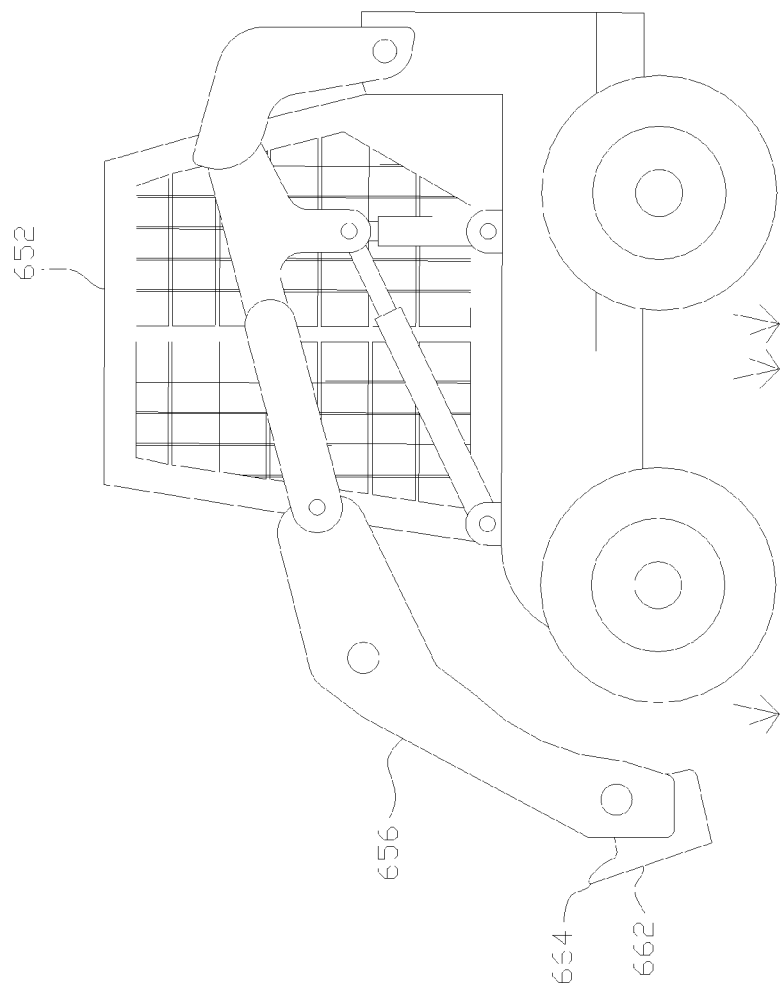
FIG. 14
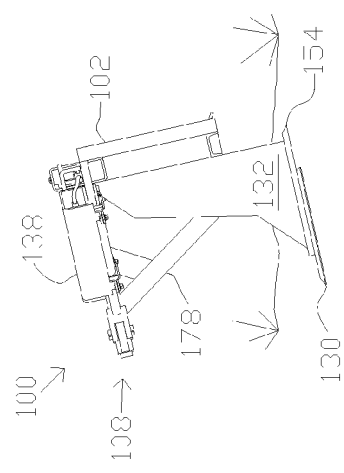

GRUBBING ATTACHMENT

CROSS REFERENCE TO RELATED APPLICATIONS

This application claims the benefit of U.S. Provisional Patent Application No. 61/383,581 entitled "Grubbing Attachment" and naming inventors Spence Hegener and Zeb O. Warner, filed Sep. 16, 2010, the disclosure of which is incorporated herein by reference.

FIELD

This application relates generally to the field of grubbing devices and methods.

BACKGROUND

Clearing land for agricultural, residential, commercial, or other use often requires selective removal of bushes, trees, and other types of brush. Manual removal can be time-consuming and labor-intensive, particularly over a large area of land, and existing devices for mechanized removal often fail to adequately remove both the above-ground growth and the bulk of the root system. In the case of perennial vegetation, portions of the root system left in the ground may re-grow unwanted vegetation unless treated with harmful chemicals.

SUMMARY

A grubbing attachment, the attachment comprising, a frame; a pincer mounted to the frame, the pincer comprising two pincer jaws wherein at least one of the pincer jaws is pivotably mounted to the frame; and a blade mounted to the frame below the pincer.

A method for removing vegetation from the ground, the method comprising: mounting a grubbing attachment to one of a skid steer loader, a track steer loader, a front-end loader, and a tractor; the grubbing attachment comprising: a frame; a pincer mounted to the frame, the pincer comprising two pincer jaws wherein at least one of the pincer jaws is pivotably mounted to the frame; and a blade attached to the frame below the pincer; urging the blade into the ground near the vegetation such that the blade engages one or more roots of the vegetation; closing the pincer jaws about all or part of an above-ground part of the vegetation; and raising the blade out of the ground so as to remove at least part of the vegetation from the ground.

A grubbing attachment, the attachment comprising: penetrating means for penetrating the ground near vegetation; actuatable grasping means for grasping an above-ground part of the vegetation, the grasping means being positioned above the penetrating means; mounting means for mounting the grubbing attachment to heavy machinery, the penetrating means being mounted to the mounting means, and the grasping means being pivotably mounted to the mounting means; and actuating means for actuating the grasping means.

BRIEF DESCRIPTION OF DRAWINGS

FIG. 10 illustrates a left side view of the frame and backing plate of the embodiment of FIG. 1.
FIG. 14 illustrates a first step in an exemplary method of using the embodiment of FIG. 1.

DETAILED DESCRIPTION

Figure 1:
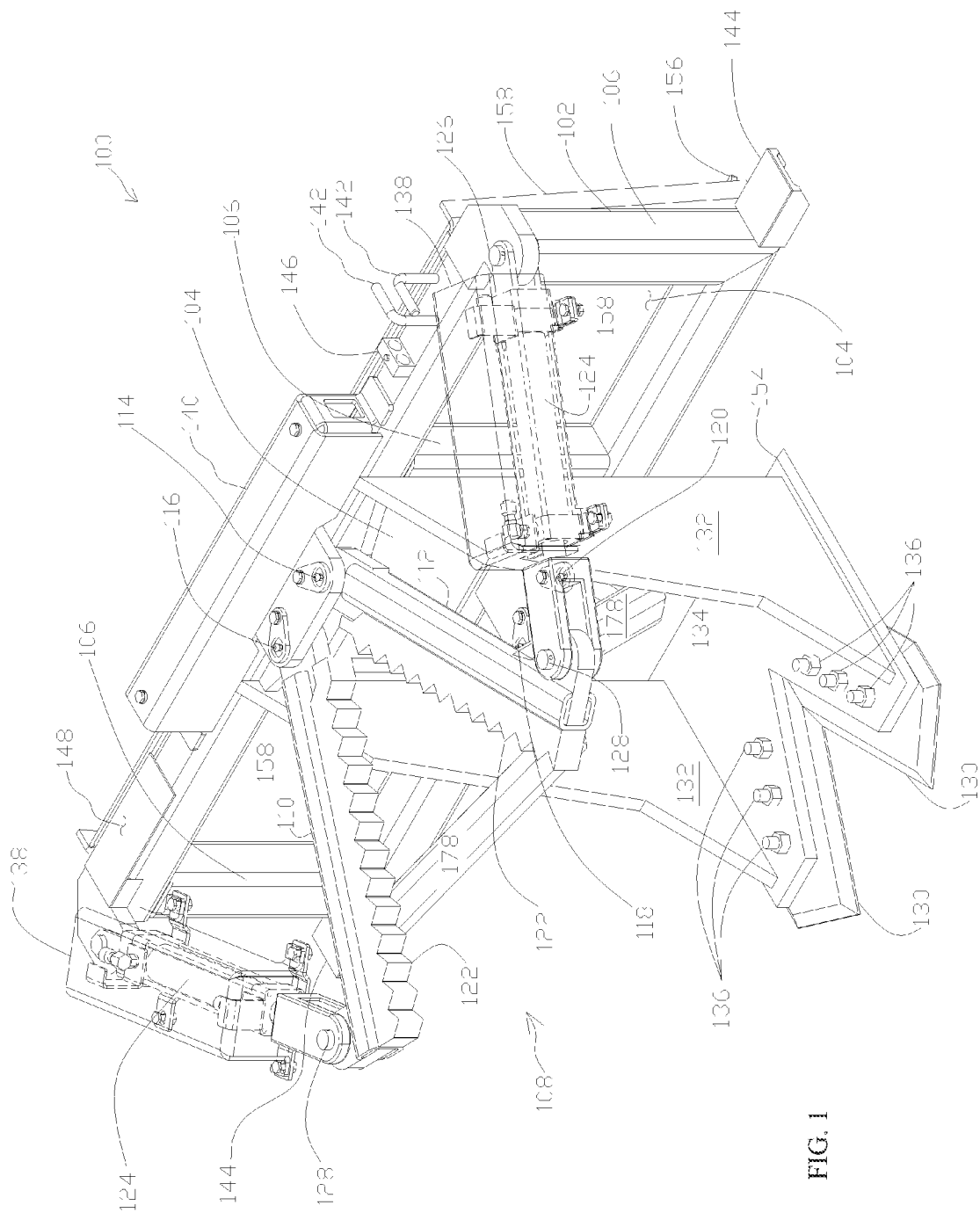
FIG. 1 illustrates a perspective view of one embodiment of a grubbing attachment.

FIG. 1 provides a perspective view of one embodiment of a grubbing attachment 100 for skid steer loaders, track steer loaders, front end loaders, excavators, tractors, and other heavy machines using hydraulic power. "Heavy equipment" and "heavy machine" as used herein mean any vehicle designed for executing construction, warehousing, excavating, or other heavy lifting and/or heavy moving operation. A frame 102 may be configured to allow ready mounting of the grubbing attachment 100 to such heavy machines using, for example, a backing plate 158, a universal skid steer mounting bracket (not shown), lip and pin assembly (as discussed further below), and/or a three point hitch (in the case of tractor applications). The frame 102 may include a variety of mounting points (not shown), such as bolt holes, pin hangers, hooks, brackets, and other devices for mounting the grubbing attachment 100 to such heavy machines, e.g., via hydraulic or manual clamps. As shown in FIG. 1, the frame 102 may be substantially planar and rectangular in shape. Alternatively, the frame 102 may be curved or have a non-rectangular shape. The frame 102 may not be a solid piece of material but rather may include at least one open space 104 and support beams 106. The frame 102 may be made of any suitable material which provides the strength necessary to mount and use the grubbing attachment 100. In other embodiments, the frame 102 may be curved and may be made up of several separate sections which attach to each other.

Figure 6:
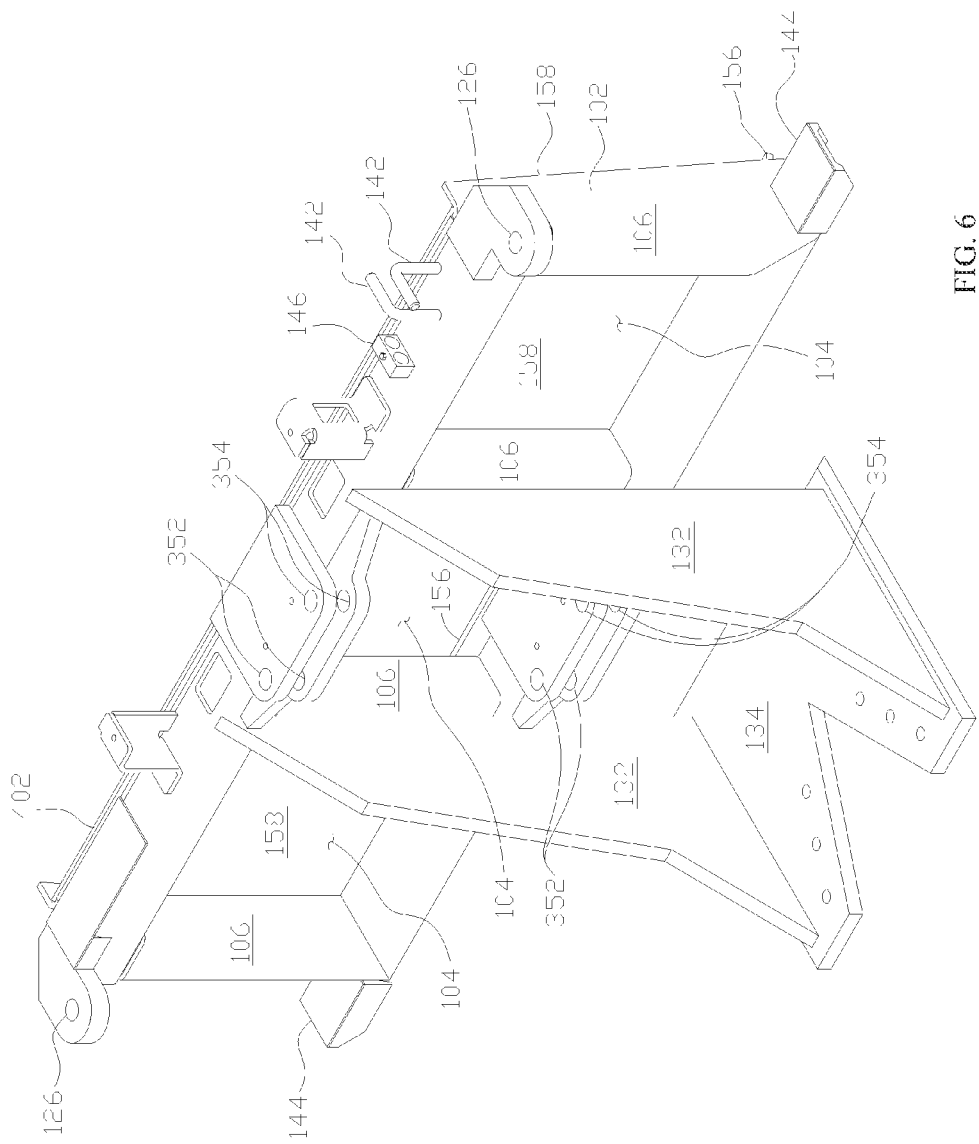
FIG. 6 illustrates a perspective view of the frame and backing plate of the embodiment of FIG. 1.
Figure 7:
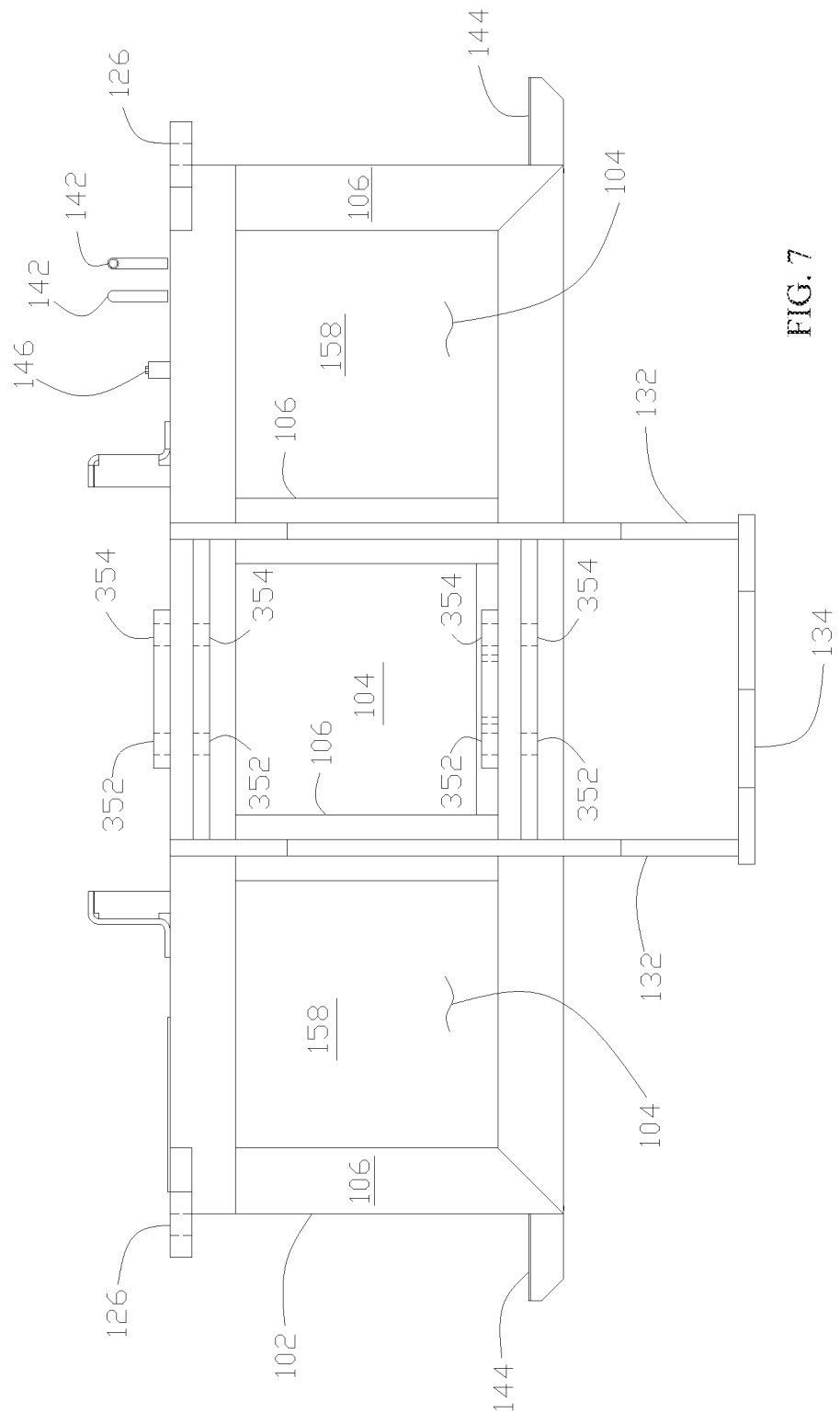
FIG. 7 illustrates a front view of the frame and backing plate of the embodiment of FIG. 1.

In some embodiments, the frame 102 may include steps 144 attached to the sides of the frame 102. In some embodiments, a step 148 may be included on the top of the frame 102. The top of the frame 102 may also include a cover 140 which may protect attachment points for hydraulic hoses (not shown). The frame 102 is shown in more detail in FIGS. 6-10. As shown in the embodiments of FIGS. 6 and 7, the frame 102 may include four support beams 106 separated by three open spaces 104, one or more of which may be covered by the backing plate 158. In alternate embodiments, the frame 102 may comprise a square shape, and may have one or more support arms extending therefrom to provide one or more pivot points 126 for one or more hydraulic pistons 124. The frame 102 may further comprise, in other embodiments, a triangular shape or some other polygonal configuration suitable for mounting grubbing blades 130 and pincer arms 110 and 112 and attachment to a skid steer or other heavy machine.

The frame 102 may attach to a backing plate 158 may be fixed to the frame 102. The backing plate 158 may removably or permanently attach to frame 102, or may be integrally formed as part of frame 102. The backing plate 158 may include an upper lip 402 and a lower lip 156 or other suitable configuration for securing the grubbing attachment 100 to a piece of heavy equipment (as discussed further below). In some embodiments, the upper lip 402 and lower lip 156 may be mounted directly to the frame 102 without the need for a backing plate 158. The upper lip 402 and lower lip 156 may be either integrally formed as part of frame 102, permanently attached to frame 102, or removably attached to frame 102. The backing plate 158 may be a substantially planar sheet of a high strength material such as steel. In some embodiments, backing plate 158 may include a universal skid steer mounting bracket.

The grubbing attachment 100 may include a pincer 108. The pincer 108 may include a first pincer jaw 110 and a second pincer jaw 112. The pincer jaws 110, 112 may pivotably connect to the frame 102 at pivot points 114, 116, 118, 120. In other embodiments, the pincer 108 may include any number of pincer jaws 110, 112 which attach to frame 102 at other pivot points.

The first pincer jaw 110 may be pivotably mounted to the frame 102 at pivot points 116, 118 while the second pincer jaw 112 may be pivotably mounted to the frame 102 at pivot points 114, 120. Each pincer jaws 110, 112 may pivot an axis that is substantially parallel to the frame 102, and may swing from a closed position (such as may be seen in FIG. 13) to an open position (as shown in FIG. 1). In some embodiments, each pincer jaws 110, 112 may pivot about an axis that is at an angle to the frame 102. For example, in some embodiments, the pincer jaws 110, 112 may pivot about axes that are at a 20 degree angle from the frame 102. As discussed further below, the pincer jaws 110, 112, legs 132, base plate 134, and blades 130 may attach to the frame 102 at a variety of angles and different attachment points. Some heavy machines may not be able to tilt the frame at certain angles, and providing the pincer jaws, blades and other parts at an angle other than parallel or perpendicular to the frame may better allow the grubbing attachment 100 to root out vegetation.

Figure 13:
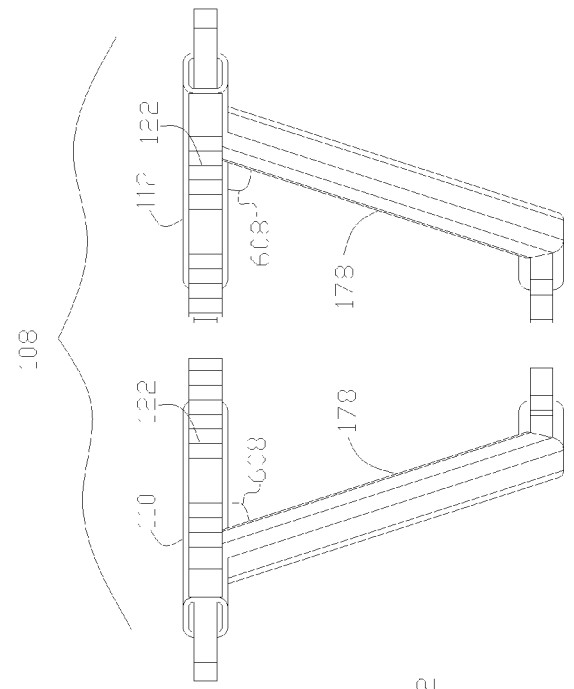
FIG. 13 illustrates a top view of the pincer arms of the embodiment of FIG. 1.

The pivot points 114, 116, 118, 120 may be hole-and-pin assemblies and may include bearings, lubricant, bushings, or both. For example, the pivot points 114, 116, 118, 120 may be provided with a grease nipple for ready lubrication. The pivot points 114, 116, 118, 120 may be located at any suitable position on frame 102. Each pincer jaw 110, 112 may be provided with one or more teeth 122. Teeth 122 may interlock when the pincer 108 is in the closed position (as shown in FIG. 13) or may not interlock when in the closed position. The teeth 122 may be configured to grasp a trunk, branches, or roots of a piece of unwanted vegetation which is to be removed (as shown in FIGS. 17-20). As used herein, "vegetation" or "piece of vegetation" may be any type of plants, living or dead, to be removed from land, and may include, but is not limited to, cedar trees, mesquite trees, wesache trees, persimmon trees, youpon trees, bushes, underbrush, and other types of brush. "Vegetation" or "piece of vegetation" may include perennial plants or other plants which may return from their root-stock if the roots are not substantially removed from the ground after removing a majority of the vegetation using the grubbing attachment 100, and may also include non-perennial plants.

Figure 24:
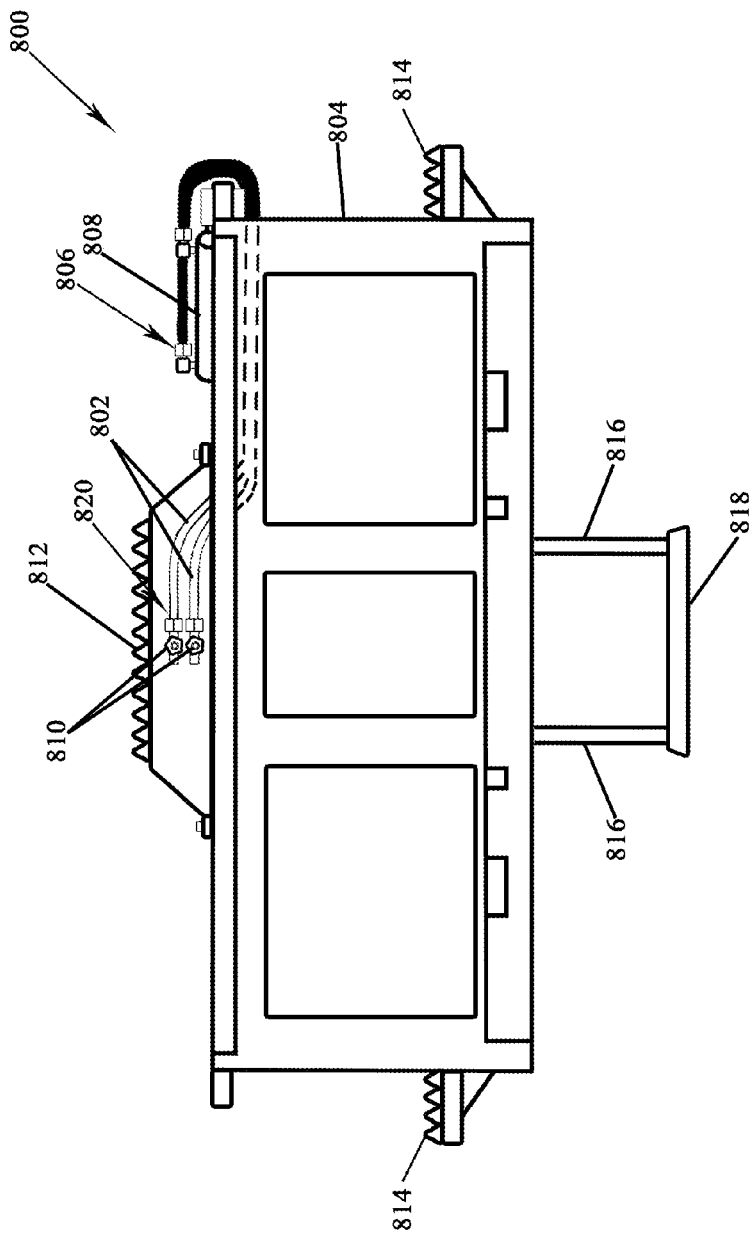
FIG. 24 illustrates a rear view of another embodiment of a frame of a grubbing attachment.

The pincer jaws 110, 112 may be made of any suitably rigid material. In one embodiment, the pincer jaws 110, 112 may be constructed of tubular or solid stock steel. Each pincer jaw 110, 112 may be powered by a hydraulic system which may comprise hydraulic pistons 124 and hoses (as shown in the embodiment of FIG. 24). Of course, the pincer 108 may be opened and closed by any other suitable power source. For example, the pincer jaws 110, 112 may be manually opened and closed and secured in a desired position. In other embodiments, the pincer 108 may be operated by an electric power source, such as an electric motor that operates the pincer jaws 110, 112 directly or through a system of gears. Likewise, a gas-powered or diesel engine may be used to operate the pincer jaws 110, 112. In yet other embodiments, the pincer jaws could be operated and secured by a ratchet mechanism, such as that used for mechanical floor jacks. Or pistons driven by compressed air rather than hydraulic fluid may be used.

Power supplied by a hydraulic power source may permit the hydraulics-powered pincer 108 to open and close. In some embodiments, the pincer jaws 110, 112 may open and close simultaneously. In some embodiments, the pincer jaw 110 may open and close independently from the pincer jaw 112, and vice versa, and each pincer jaw 110, 112 may be controlled independently. For example, pincer jaw 110 may be moved to the closed position while pincer jaw 112 remains in the open position. In other embodiments, one pincer jaw 110, 112 may be non-pivotably secured to the frame 102 such that only one pincer jaw 110, 112 pivots with respect to the frame 102.

Each hydraulic piston 124 may be pivotably mounted to a pincer jaw 110, 112 at a pivot point 128, and pivotably mounted to the frame 102 at a pivot point 126. Each of the pivot points 126, 128 may include a bearing, bushing, bossing, or other similar device, as well as a type of lubrication, to allow pivoting of the pincer jaws 110, 112 with respect to the hydraulic pistons 124 and frame 102. Pivot points 126, 128, as well as pivot points 114, 116, 118, 120, may include reinforcing structure for heavy duty applications, such as, for example, bossing (not shown), to strengthen pivot points 126, 128, 114, 116, 118, 120. Pivot points 128 may be located at any suitable position on pincer jaws 110, 112 and pivot points 126 may be located at any suitable position on frame 102. In some embodiments, for example, pincer jaws 110, 112 may extend beyond pivot points 128 such that pivot points 128 are located at a midpoint on pincer jaws 110, 112. The hydraulic pistons 124 may be attached to hydraulic hoses 802, as shown in FIG. 25. The hydraulic system may be connected with a hydraulic power source, such as that typically built into a skid steer loader or other heavy machine, or may be connected to an auxiliary hydraulic power source. In some embodiments, covers 138 may be attached to the pistons 124 to protect the pistons 124. A cover 140 may cover a connection point between the hoses and the hydraulic system or additional hydraulic hoses. In some embodiments, hose guides 142 and a clamp 146 may be configured to retain the hydraulic hoses along the frame 102 when the grubbing attachment 100 is in use.

Figure 6A:
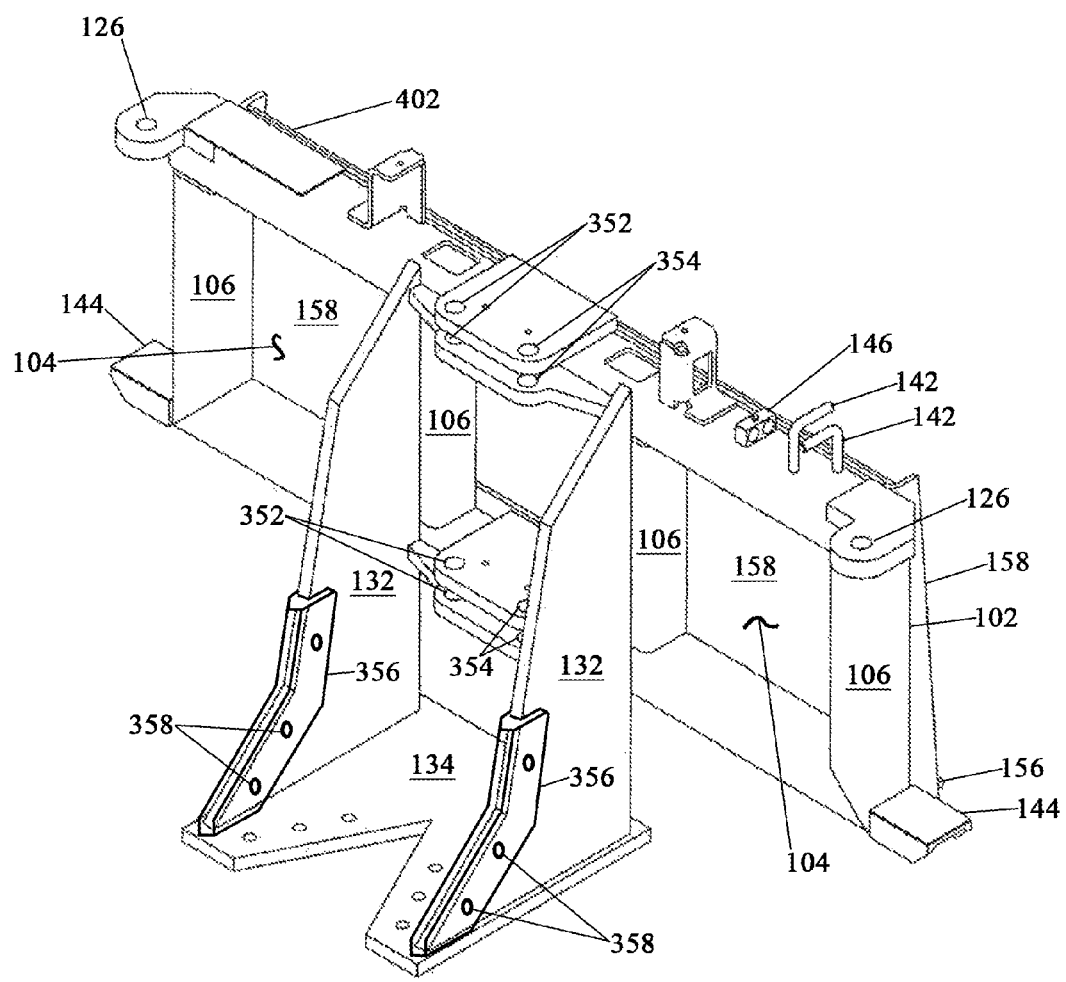
FIG. 6A illustrates a perspective view of the frame and backing plate of FIG. 6 with wear plates.

One or more blades 130 may be positioned in some embodiments below the hydraulics-powered pincer 108 and attached to the frame 102. A base plate 134 may be used as a mounting surface for the blades 130. In the embodiment of FIG. 1, two blades 130 are positioned to form a 'V'. Of course, the point of the 'V' may be toward the frame 102 or away from the frame 102. In other words, they 'V' of blades 130 may open toward the vegetation to be removed, or the point of the 'V' may be towards the vegetation to be removed. Of course, the one or more blades 130 may take any other suitable orientation for grubbing out unwanted vegetation. The blades 130 may be fixed to the base plate 134. The base plate 134 may be attached to the frame 102 below the pincer 108 or may be attached to one or more legs 132 to form a grubbing bucket. A grubbing bucket may comprise one or more legs 132 and a base plate 134, and may further comprise one or more blades 130. The legs 132 may be removably attached to the frame 102 at one or more points or may be permanently attached to the frame 102 or integrally formed with the frame 102. The legs 132 may be attached to frame 102 at a variety of positions to change, for example, the grubbing depth and grubbing width of the blades 130 or base plate 134. In some embodiments, the legs 132 may be provided with additional bracing (not shown) to prevent twisting of the legs 132 or blades 130 when the blades 130 penetrate the ground under a piece of vegetation. The blades 130 may be removably or fixedly mounted to the legs 132, to base plate 134, or directly to the frame 102 without the use of a base plate 134. The blades 130 may be fixed to a leg 132 which is attached to the frame 102 so as to provide clearance for the blade(s) 130 to engage the earth and other materials without obstruction by frame 102. The blades 130 may be removably mounted with, e.g., bolts 136, to allow easy sharpening, repair, or replacement of the blades 130, or may be welded to the base plate 134. Bulldozer blades may be suitably used, as may any blade suitable for grubbing. In some embodiments, the grubbing attachment 100 may not include blades 130 and the base plate 134 may be made of a material which is sufficiently rigid to perform the functions otherwise performed by the blades 130. In some embodiments, the base plate 134 may be constructed of a solid piece of hardened steel with a V-shaped opening, similar to the opening between blades 130, and may be used for grubbing without the blades 130. In some embodiments, the legs 132, base plate 134, blades 130, and frame 102 are a unitary piece and may be made of hardened steel. In some embodiments, the grubbing bucket comprising the legs 132, base plate 134, and blades 130 may be a unitary assembly which may be removably or permanently attached to frame 102. In some embodiments, the legs 132, base plate 134, and blades 130 may be separate pieces, but may be removed and replaced as a unitary piece if any one of the legs 132, base plate 134, or blades 130 becomes worn. Of course, the blade or blades 130 may be shaped or oriented so as to form a spade shape, a square edge, or any configuration suitable for grubbing. In addition, other elements of the grubbing attachment 100 may be made of a material that is sufficiently durable to perform functions similar to those performed by the blades 130, such as digging in the earth and cutting roots. In some embodiments, for example, all or part of the legs 132 may be covered with one or more wear plates 356 (as shown in FIG. 6A) or include one or more blades. In some embodiments, the base 252 of legs 132 may be covered with one or more wear plates 356 which may be sharp and so as to allow the legs 132 to better penetrate the soil. Wear plates 356 may be permanently or removably attached to different parts of the grubbing attachment 100. The blades 130 and wear plates 356 may be sharp in some embodiments and may be dull in other embodiments. In some embodiment, the blades 130 may be configured to cut a root of a piece of vegetation that is being removed while in other embodiments, the blades 130 may be configured such that they do not cut a root of a piece of vegetation that is being removed.

Figure 2:
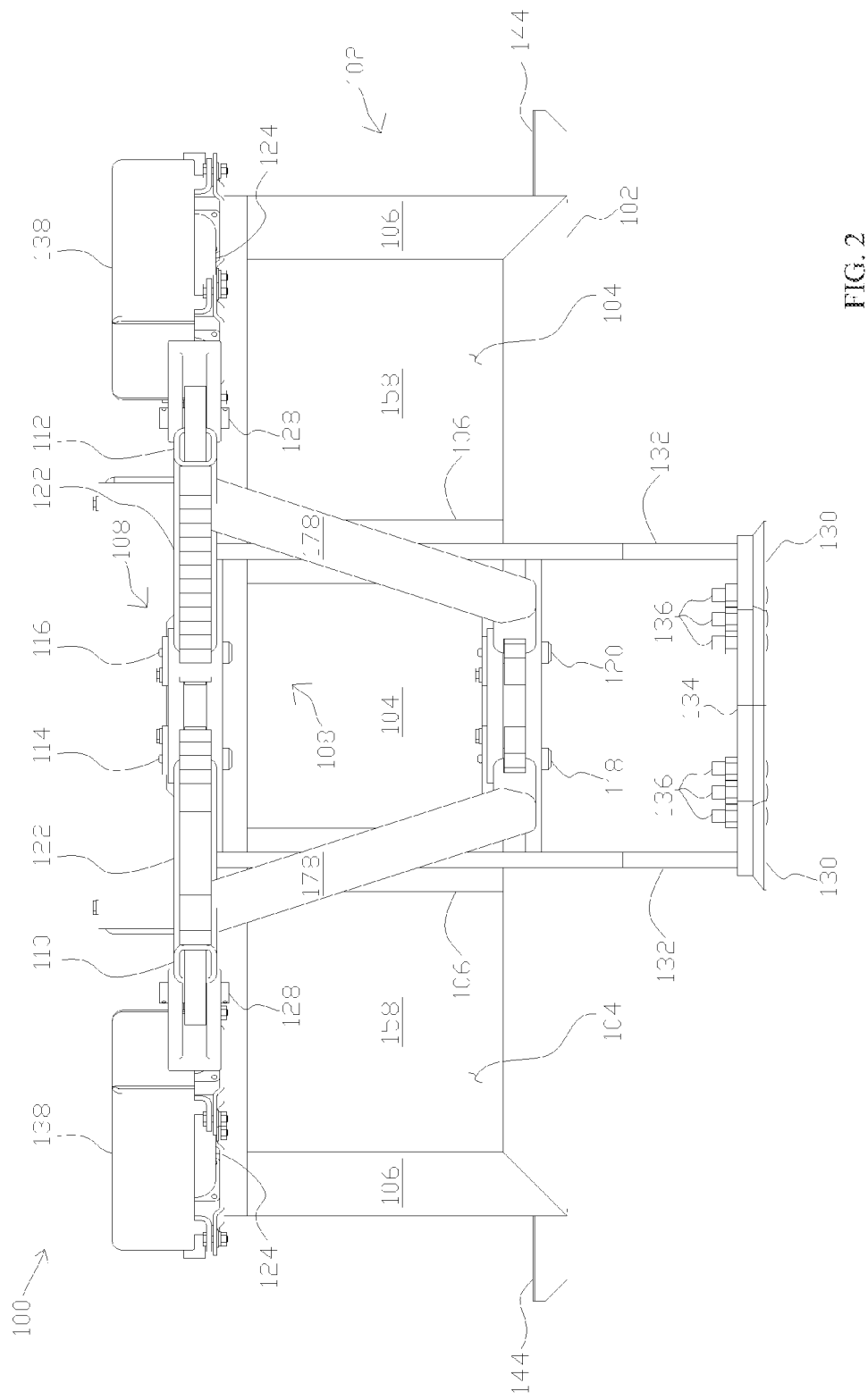
FIG. 2 illustrates a front view of the embodiment of FIG. 1.

FIG. 2 provides a front view of the embodiment of FIG. 1. As described above, the hydraulics-powered pincer 108 may comprise two pincer jaws 110, 112 and may be pivotably mounted to the frame 102 at pivot points 114, 116, 118, 120. As can be seen in FIG. 2, each pincer jaw 110, 112 may pivot about an axis that is substantially parallel to the plane of frame 102, and may be oriented substantially perpendicularly to the frame 102. As shown in FIG. 2, the pincer jaws 110, 112 may be oriented generally parallel to the blades 130, but may be oriented at an angle to the blades 130, as well. In other embodiments, both the pincer 108 and the blades 130 may substantially parallel to each other, but may both be oriented at an angle, e.g., at fifteen (15) degrees, to the frame 102. In some embodiments, both the pincer 108 and the blades 130 may not be substantially parallel to each other and may be at an angle to the frame 102. In some embodiments, the pincer 108 and the blades 130 may be at different angles to the horizontal plane around a substantially vertical axis. In some embodiments, for example, one of the pincer jaws 110, 112 and the blades 130 may be substantially perpendicular to the frame 102 while the other of the pincer jaws 110, 112 and blades 130 may be at an angle to the frame 102. In some embodiments, the blades 130 may be angled upwardly with respect to the pincer 108. In some embodiments, the blades 130 may be angled downwardly with respect to the pincer 108. In some embodiments, the pincer 108, or one or the other of pincer jaws 110, 112, may be angled upwardly or downwardly with respect to the blades 130.

Each pincer jaw 110, 112 may be provided with one or more teeth 122, and may, in some embodiments, be powered by a hydraulic system comprising hydraulic pistons 124 (as shown in FIG. 1) and hoses (as shown in FIG. 24). Each hydraulic piston 124 may be provided with a hydraulic cover 138 to protect the hydraulic hoses and pistons 124 from abrasion or puncture. The hydraulic cover 138 may be attached using any suitable fastener, such as cotter pins, brackets, U-bolts or weld. Hydraulic hoses (not shown) may carry pressurized fluid from a hydraulic power source (not shown) to the hydraulic pistons 124. Each pincer jaw 110, 112 may further optionally comprise one or more braces 178 having pivot points 118, 120 to better allow the pincer jaw 110, 112 to resist twisting forces. If braces 178 are not used, then pivot points 118, 120 may not be needed. In other embodiments, braces 178 may be oriented substantially parallel to the pincer arms 110, 112 and connected to the pincer arms 110, 112 to form a truss-like structure.

Figure 3:
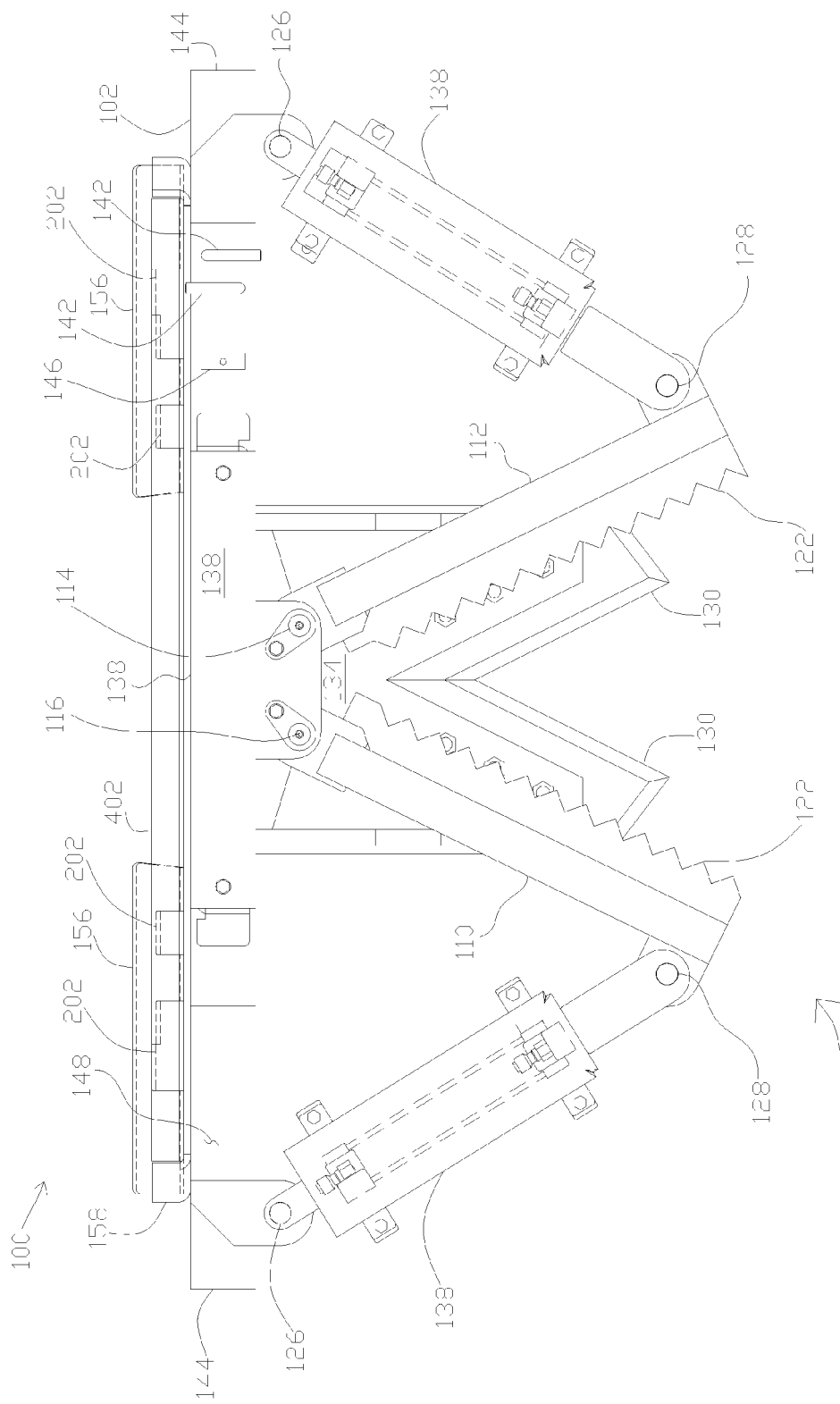
FIG. 3 illustrates top view of the embodiment of FIG. 1.

FIG. 3 provides a top view of the grubbing attachment 100 of FIG. 1. In FIG. 3, the pincer jaws 110, 112 are shown in an open position ready to grasp unwanted vegetation. The pincer jaws 110, 112 may be pivotably mounted to the frame 102 and powered by hydraulic pistons 124. As shown in FIG. 3, the angle between blades 130 and the angle between pincer jaws 110, 112 may be substantially similar, but may also be at different angles. In addition, the blades 130 and the pincer 108 may be generally centrally aligned when viewed in a top view, as shown in FIG. 3, but may be offset, as well. For example, one or more pincer arms 110, 112 may be oriented and pivotably mounted to the frame such that vegetation may be captured between the frame 102 and one or more of the pincer arms 110, 112, instead of being captured solely or partially between pincer arms 110, 112.

Figure 4:
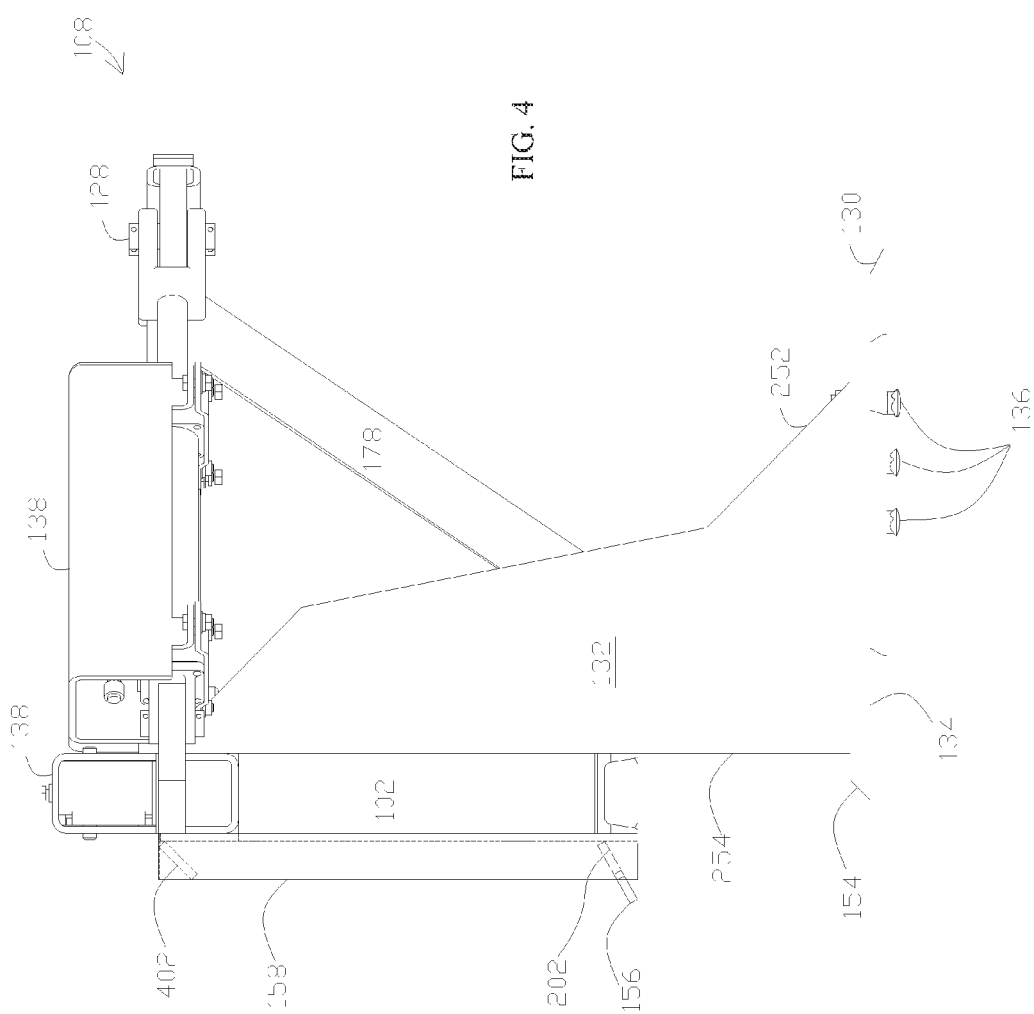
FIG. 4 illustrates a right side view of the embodiment of FIG. 1.
Figure 5:
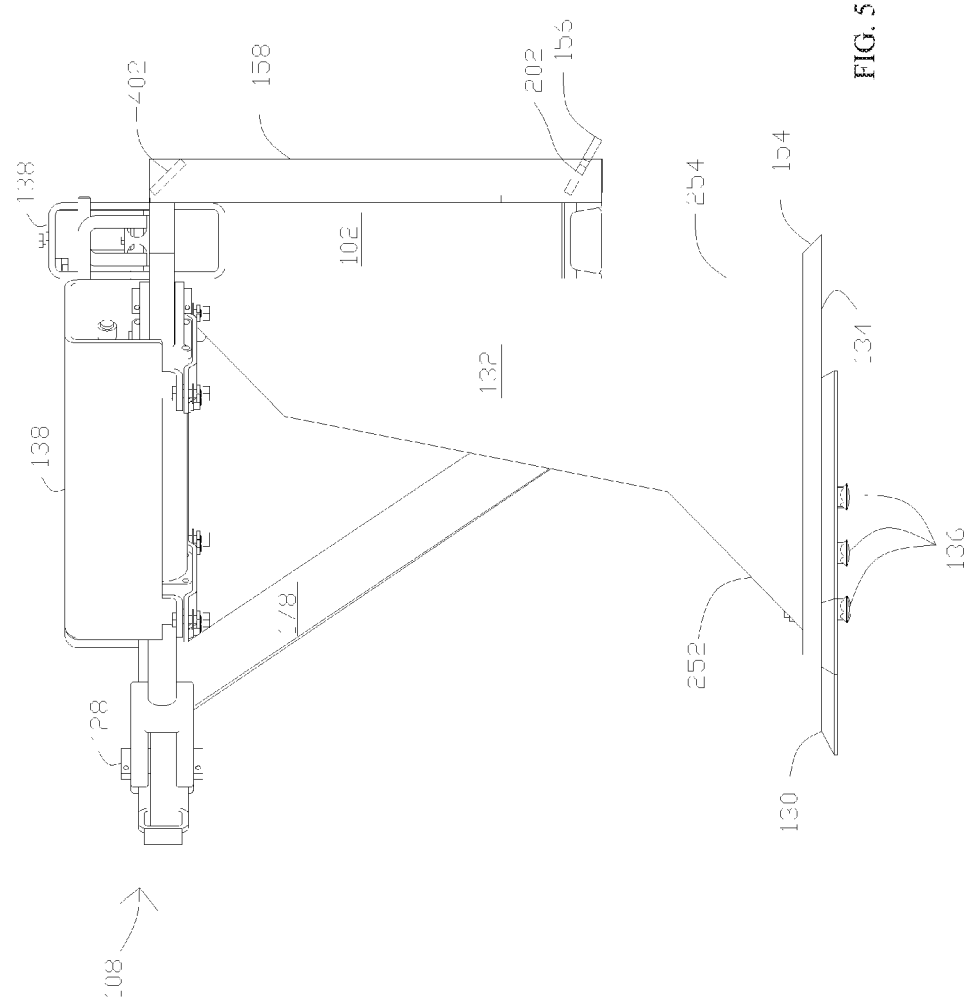
FIG. 5 illustrates a left side view of the embodiment of FIG. 1.
Figure 17:
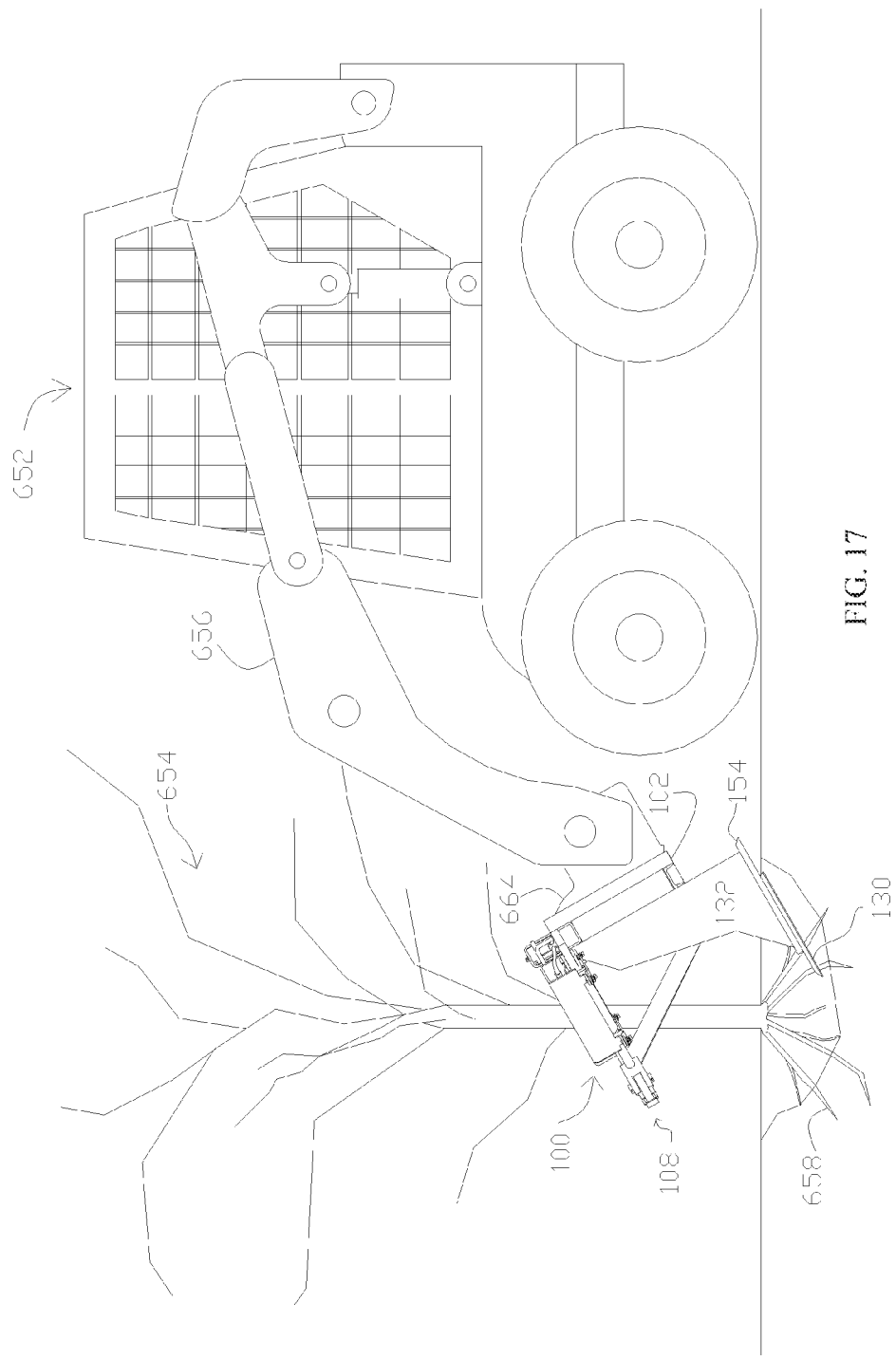
FIG. 17 illustrates a third step in an exemplary method of using the embodiment of FIG. 1.

FIGS. 4 and 5 show right and left side views, respectively, of the grubbing attachment 100 of FIG. 1. As shown in the side views of FIGS. 4 and 5, the leg 132 may include a wider base 252 and a substantially straight back section 254 which may attach to the frame 102, e.g., by bolts or weld. As shown in FIGS. 4 and 5, base 252 may be angled back for easier ground penetration. In other embodiments, the leg 132 may be any suitable shape and size which provides suitable strength to substantially maintain the orientation of the blade or blades 130 with respect to the frame 102 and/or pincer 108. The blade 130 may be attached to a distal end of the leg 132 such that there is a space between the pincer 108 and the blade 130 which allows the pincer 108 to remain generally above ground level while the blade 130 enters the ground (for example, as shown in FIG. 17). The leg 132 may be mounted to the frame 102 so as to position the blade 130 generally centrally under the pincer 108 (as shown in FIG. 3). A back-blade 154 may be provided on an opposite end of the leg 132 from the blade 130 to allow grubbing and/or scraping with the back edge of the base plate 134. A back-blade 154 may allow an operator to fill in a hole (such as, for example, hole 660 in the embodiment of FIGS. 18 and 19) left by root removal, or to attack a piece of vegetation from a different angle.

Figure 8:
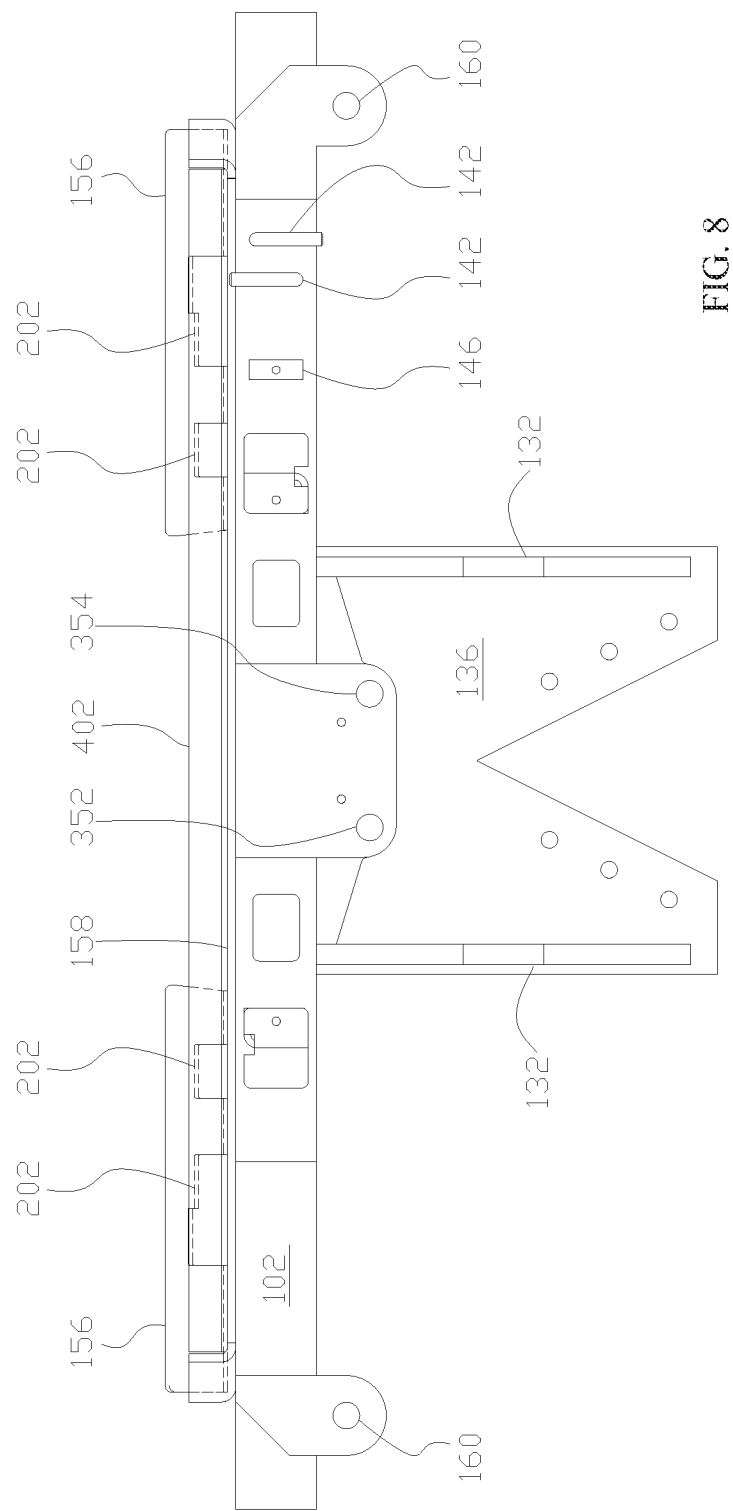
FIG. 8 illustrates a top view of the frame and backing plate of the embodiment of FIG. 1.

FIGS. 6-10 provide views of the grubbing attachment 100 of FIG. 1 without the pincer jaws 110, 112 and blades 130. As shown in FIGS. 6-8, the frame 102 may one or more include apertures 352, 354 which may comprise part of the pivot points 114, 116, 118, 120 between the frame 102 and the pincer jaws 110, 112. FIG. 6 illustrates a perspective view of the frame 102 of the embodiment of FIG. 1. Apertures 352, 354 may be located at any suitable location to allow the pincer jaws 110, 112 to pivot with respect to the frame 102. In some embodiments, for example, there may be more distance between apertures 352 and apertures 354. In other embodiments, there may be less distance between apertures 352 and apertures 354. While four apertures 352 and four apertures 354 are shown in the embodiment of FIG. 6, any suitable number of apertures may be included in frame 102. Additionally, pincer jaws 110, 112 may be pivotably secured to frame 102 by any other suitable means, for example, through the use of bearings or ball joints. Legs 132 may be secured to frame 102 through any suitable means, for example, welded connection, bolt and nut connection, or by forming the legs 132 as an integral part of frame 102. In addition, legs 132 may be attached to frame 102 at any suitable location and at any suitable angle. For example, in some embodiments, the legs 132 may be attached to frame 102 such that they are further apart from each other to accommodate a larger base plate 134. Additionally, in some embodiments, the legs 132 may be shorter so that the base plate 134 and blades 130 are closer to the frame 102 or the legs 132 may be longer so that the base plate 134 and blades 130 are further from the frame 102. Legs 132 may be of any suitable thickness and width and may increase in thickness and/or width near attachment points to frame 102 and base plate 134.

FIG. 6A shows wear plates 356 attached to legs 132. Wear plates 356 may be attached to any part of the grubbing attachment 100 and may provide wear resistance. Wear plates 356 may be replaceable and may removably attach to the grubbing attachment 100. Wear plates 356 may attach to the legs 132 by way of bolts 358, or by way of cotter pins, rivets, weld or any other suitable fastener.

Figure 6B:
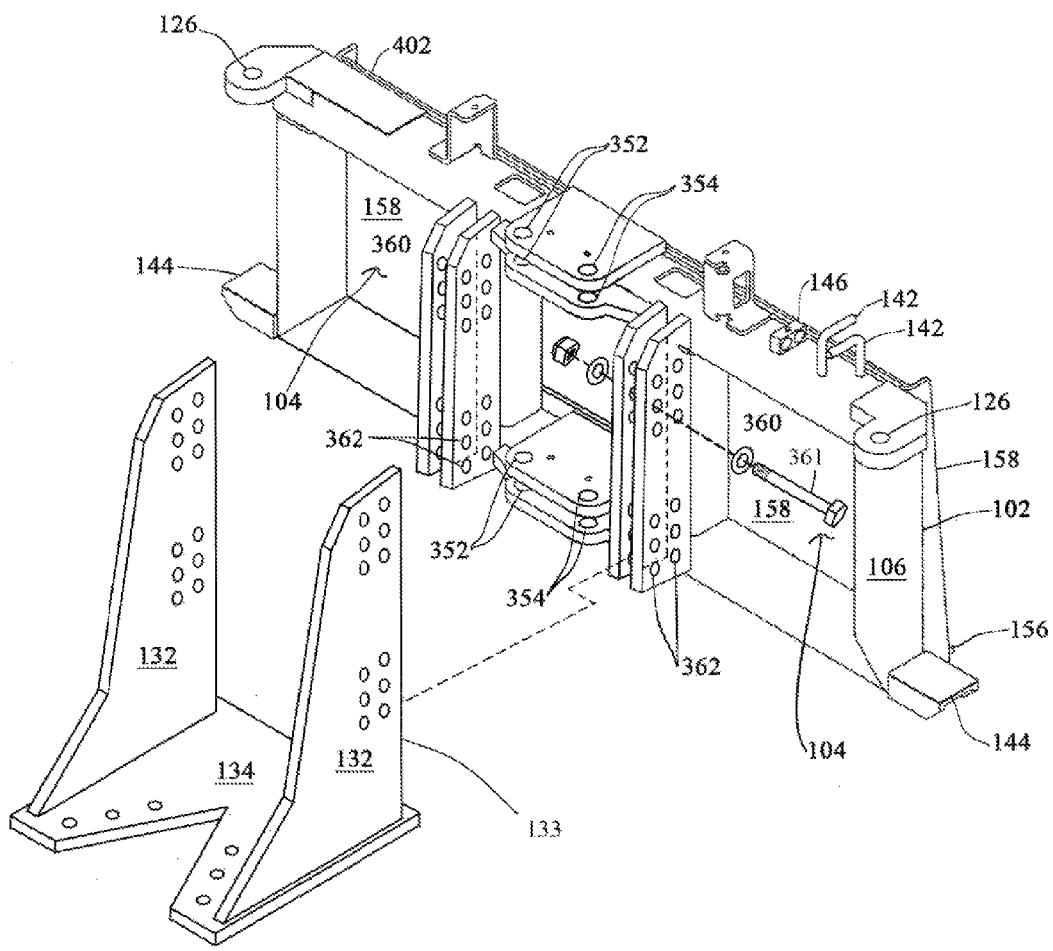
FIG. 6B illustrates a perspective view of the frame and backing plate of FIG. 6 with adjustable leg mountings.

FIG. 6B shows adjustable mounting plates 360 connected to frame 102. Adjustable mounting plates 360 may allow for attachment of the legs 132 of grubbing bucket 133 at different positions with respect to the frame 102. As shown more clearly in FIG. 9B, the legs 102 may include one or more apertures 364 which may correspond with one or more apertures 362 in the adjustable mounting plates 360. Adjustable mounting plates 360 may be configured such that apertures 362 may be aligned with apertures 364 and may secure legs 132 to the adjustable mounting plates 360 when a pin, bolt 361 or other suitable fastener is placed through aligned apertures 362 and 364. Apertures 362 and 364 may be fortified for heavy duty applications with, for example, a bushing within each of apertures 362 and 364. By aligning different apertures 362 with apertures 364, the legs 132 and base plate 134 may be raised and lowered with respect to frame 102. While apertures 362, 364 are shown in the embodiments of FIGS. 6A, 6B, 9A, and 9B, one of skill in the art will recognize that any type of attaching mechanism, such as clamps, may be used to removably and adjustably secure the legs 132 to frame 102.

FIG. 7 illustrates a front view of the frame 102 and backing plate 158 of the embodiment of FIG. 1. Base plate 134 may be attached at a distal end of legs 132. Base plate 134 may be attached by any suitable means or may be integrally formed as part of legs 132. As shown in FIG. 7, base plate 134 may be positioned a distance away from frame 102 at the distal end of legs 132. Frame 102 may be configured in any suitable manner to support the pincer jaws 110, 112, legs 132, base plate 134, blades 130, and other elements. As described above, frame 102 may include any number of support beams 106 or may be a solid, planar structure without support beams 106. Frame 102 may include open spaces 104 or may include a solid, planar structure between support beams 106. Although frame 102 is shown with a rectangular structure in FIG. 7, the frame 102 may be any suitable shape, including, for example, a round shape, an oval shape, or a square shape. As shown in FIG. 7, backing plate 158 may be substantially the same height and width as frame 102. In other embodiments, backing plate 158 may be larger or smaller than frame 102.

FIG. 8 illustrates a top view of the frame 102 of the embodiment of FIG. 1. As shown in FIG. 8, backing plate 158 may include an upper lip 402 and lower lips 156 for attachment to a skid steer loader or other heavy machine. Lower lips 156 may include pin holes 202 which may be configured to removably secure frame 102 to a piece of heavy equipment, such as a skid steer loader. In the case of a skid steer loader, for example, the backing plate 158 may attach to a quick attachment mechanism 662 (as shown in FIGS. 14-20) commonly found on skid steer loaders. As discussed in more detail with reference to FIGS. 14 and 15, the upper lip 402 may rest on a top edge 664 of a quick attachment mechanism 662 while pins of the quick attachment mechanism 662 extend through corresponding pin holes 202 in the lower lips 156 to secure the frame 102 to the quick attachment mechanism 662. Any number of lips 156 and 402 may form part of backing plate 158.

Additionally, the frame 102 may not include a backing plate 158 and lips 156 and 402 may be formed as part of frame 102. The pin holes 202 may be shaped, located, and sized to accommodate several different types and configurations of attachment means for several different types of heavy equipment. In other embodiments, instead of lips 402, 156, any suitable attachment means may be used to secure the frame 102 to the piece of heavy equipment.

Figure 9:
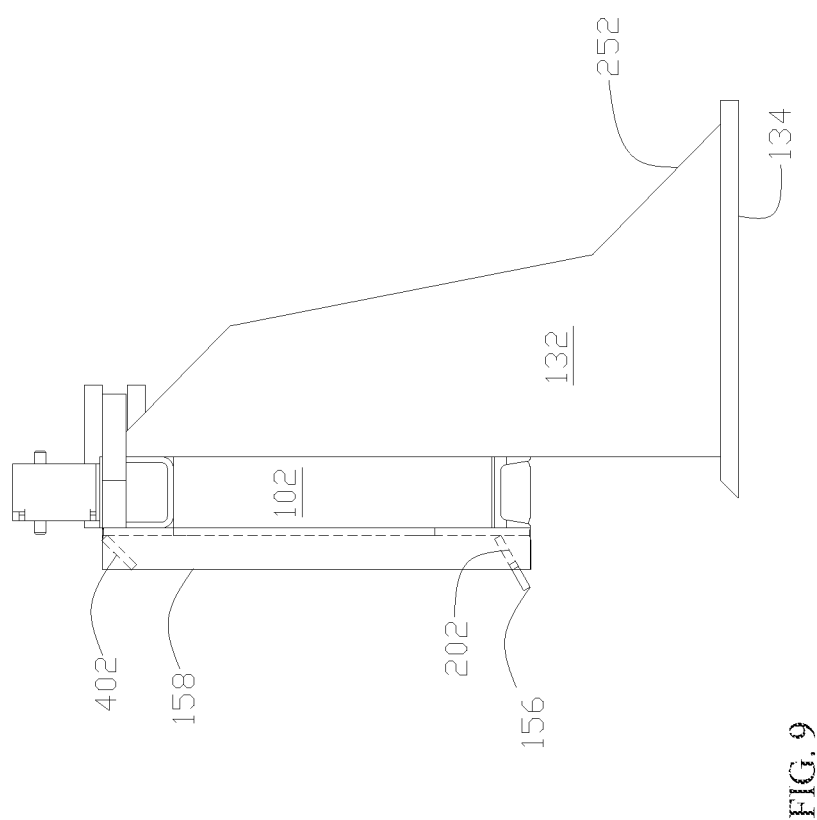
FIG. 9 illustrates a right side view of the frame and backing plate of the embodiment of FIG. 1.

FIGS. 9 and 10 illustrate a right and left side view of the frame 102 of the embodiment of FIG. 1, respectively. As shown in FIGS. 9 and 10, legs 132 may include a wider base 252 near the attachment point to the base plate 134. Legs 132 may be any suitable size and shape and may be made of any suitable material. In some embodiments, legs 132 may include open spaces similar to the open spaces 104 in frame 102 and may include support beams similar to the support beams 106 in frame 102. Legs 132 may be any suitable thickness and may increase in thickness near connection points with the frame 102 and base plate 134. Although the embodiment of FIG. 1 includes two legs, one leg 132 or more than two legs 132 may be included in other embodiments.

The backing plate 158 may attach to the frame 102 and may be similarly shaped to the frame 102. As shown in FIGS. 9 and 10, backing plate 158 may include lips 402 and 156 which may be positioned at opposite ends of backing plate 158. The backing plate 158 may include any number and orientation of lips 402 and 156.

Figure 9A:
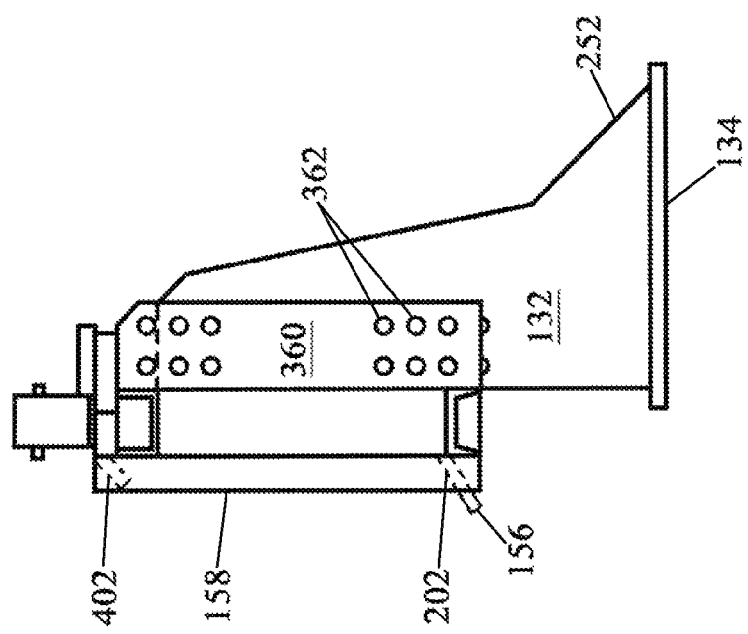
FIG. 9A illustrates a right side view of the frame and backing plate of FIG. 9 with an adjustable mounting plate.

FIG. 9A shows a side view of an embodiment which includes adjustable mounting plates 360. The adjustable mounting plates 360 may include apertures 362 which may align with apertures 364 in legs 132, as shown in FIG. 9B.

Figure 9B:
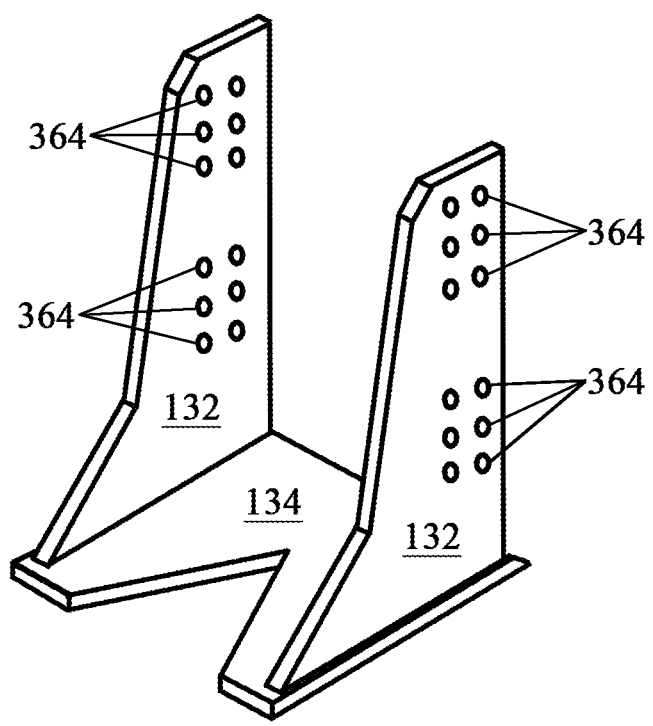
FIG. 9B illustrates a perspective view of legs and a base plate configured to be connected with the adjustable mounting plate of FIG. 9A.

FIG. 9B shows a perspective view of one embodiment of a grubbing bucket having legs 132 which include apertures 364. Apertures 364 may be configured to align with apertures 362 in legs 132, as discussed above. Legs 132 and base plate 134 may be permanently connected and may be removably attached to frame 102 by placing one or more fasteners through one or more apertures 364 aligned with one or more apertures 362 of the adjustable mounting plate 360. Thus, the grubbing attachment disclosed herein may include a replaceable grubbing bucket.

Figure 12:
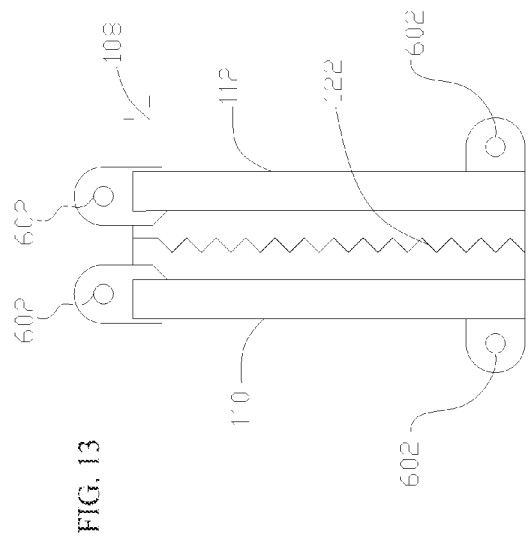
FIG. 12 illustrates a front view of the pincer arms of the embodiment of FIG. 1.
Figure 11:
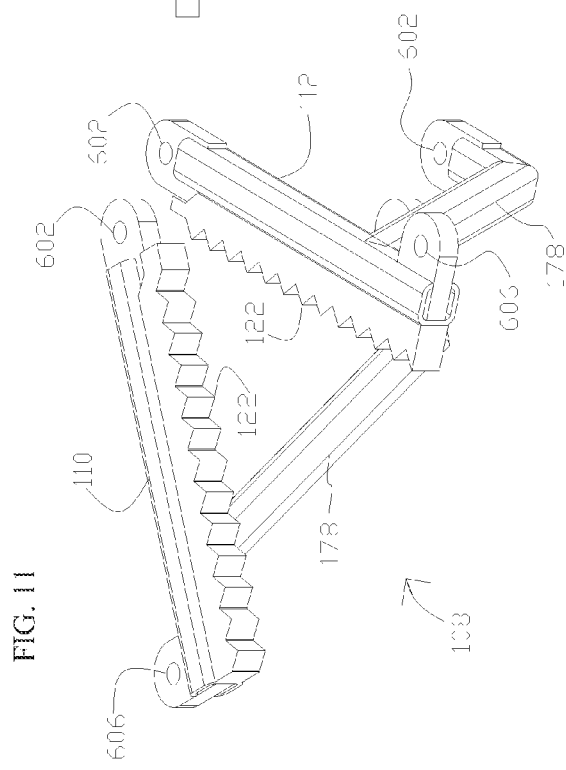
FIG. 11 illustrates a perspective view of the pincer arms of the embodiment of FIG. 1.

FIGS. 11-13 provide views of the pincer jaws 110, 112 separate from the grubbing attachment 100 of FIG. 1. FIG. 11 illustrates a perspective view of the pincer arms of the embodiment of FIG. 1. The pincer jaws 110, 112 may include apertures 602, which may comprise part of the pivot points 114, 116, 118, 120 between the frame 102 and the pincer jaws 110, 112 and may be configured to mate with pins to secure the pincer jaws 110, 112 to the frame 102. The pincer jaws 110, 112 may also include apertures 606 which comprise part of the pivot points 128 between the pincer jaws 110, 112 and hydraulic pistons 124. The apertures 602, 606, as well as apertures 160, 352, 354 may each include a boss or bushing made of hardened steel which mates with a hardened steel pin to strengthen the pivot points 114, 116, 118, 120, 128, 126 for heavy duty applications. In other embodiments, other methods of reinforcement may be used to strengthen pivot points 114, 116, 118, 120, 128, 138. In different embodiments, the braces 178 of the pincer jaws 110, 112 may attach to the pincer jaws 110, 112 at different angles and at different positions. In other embodiments, additional support structure may be included in the pincer jaws 110, 112 to provide additional strength.

FIG. 12 illustrates a front view of the pincer jaws 110, 112 of the embodiment of FIG. 1. The pincer jaws 110, 112 are shown in an opened position. As described above, the braces 178 may be configured in any suitable manner to provide additional strength to pincer jaws 110, 112. Pincer jaws 110, 112 may be made of any suitable material and may be made in any suitable thickness. The angle 608 between pincer jaws 110, 112 and brace 178 may be any suitable angle. In addition, pincer jaws 110, 112 and brace 178 may be any suitable length. Additional braces may extend from brace 178 to pincer jaws 110, 112 to provide further strength to pincer 108. In some embodiments, the area between pincer jaws 110, 112 and brace 178 may include a planar support structure, such as planar sheet metal. Connection points between the pincer jaws 110, 112 and brace 178 may include fillets to provide additional strength.

FIG. 13 illustrates a top view of the pincer jaws 110, 112 of the embodiment of FIG. 1. Pincer jaws 110, 112 may include one or more teeth 122 which may or may not interlock when the pincer jaws 110, 112 are in the closed position, as shown in FIG. 13. The teeth 122 may be made of any suitable material and may be secured to pincer jaws 110, 112 or may be integrally formed with pincer jaws 110, 112. Thus, in some embodiments, teeth 122 may be removably attached to pincer jaws 110, 112, for example, through the use of bolts, and may be periodically replaced if teeth 122 become worn. In some embodiments, teeth may be permanently attached to pincer jaws 110, 112 and may be secured to pincer jaws 110, 112, for example, by welding. In some embodiments, teeth 122 may be configured to grasp branches and other parts of unwanted vegetation.

Figure 15:
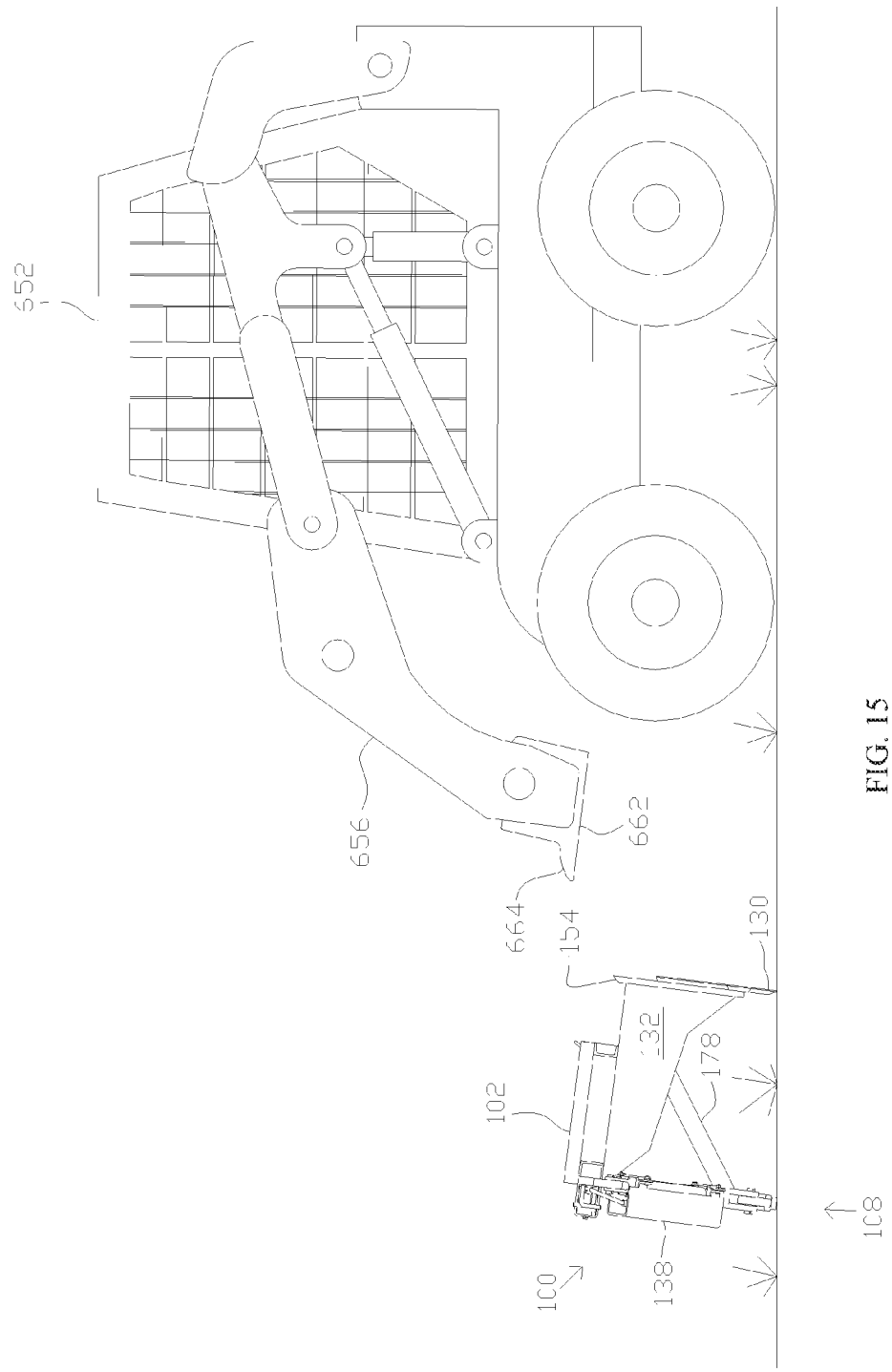
FIG. 15 illustrates another embodiment of the first step illustrated in FIG. 14.

FIGS. 14-21 show one embodiment of a method for using a grubbing attachment 100. A skid steer loader 652 having a hydraulic power source (not shown) may have a loading arm 656 which may include a quick attachment mechanism 662. The quick attachment mechanism 662 may include a top edge 664 which is configured to receive lip 402 (as shown in FIG. 8) and may have pins which are configured for receiving in pin holes 202. The quick attachment mechanism 662 may be hydraulically or electrically powered, or may be manually operated to secure the grubbing attachment 100 to the loader 652. In use, the grubbing attachment 100 may be stored in a substantially vertical position, as shown in FIG. 14, or in a substantially horizontal position, as shown in FIG. 15. A user may move the skid steer loader 652 near the grubbing attachment 100 and may move the quick attachment mechanism 662 so that the top edge 664 receives lip 402 of the frame 102. At this point, the loading arms 656 may be raised slightly such that the grubbing attachment 100 is lifted off the ground and such that the frame 102 and/or backing plate 158 rest against the quick attachment mechanism 662. Pins (not shown) on the quick attachment mechanism 662 may then extend through corresponding pin holes 202 in lower lips 156 to secure the grubbing attachment 100 to the quick attachment mechanism 662. Other methods and means of attaching the grubbing attachment 100 to the loading arms 656 of the skid steer loader 652 or other piece of heavy equipment may be used as suitable for such machines.

As described above, the grubbing attachment 100 may include a frame 102, a pincer 108, and a blade 130. In practice, the grubbing attachment 100 may be used to uproot and remove any unwanted vegetation, including small trees such as wesache trees, persimmon trees, cedar trees, youpon trees, or, for example, mesquite tree 654, and some or all of the roots of the unwanted vegetation, such as, for example, the roots 658 of mesquite tree 654, as shown in FIGS. 16-21. As described above, mesquite tree 654 is used in the embodiments of FIGS. 16-21 as one example of vegetation that may be removed using the grubbing attachment 100. Of course, the grubbing attachment 100 may be used to remove any type of vegetation, including, but not limited to, small cedar, mesquite, wesache, persimmon, or youpon trees, bushes, underbrush, and other types of brush. Thus, while mesquite tree 654 is shown in the embodiments of FIGS. 16-21, the process described herein, and other embodiments of the described process, may be used to remove any unwanted vegetation.

Figure 16:
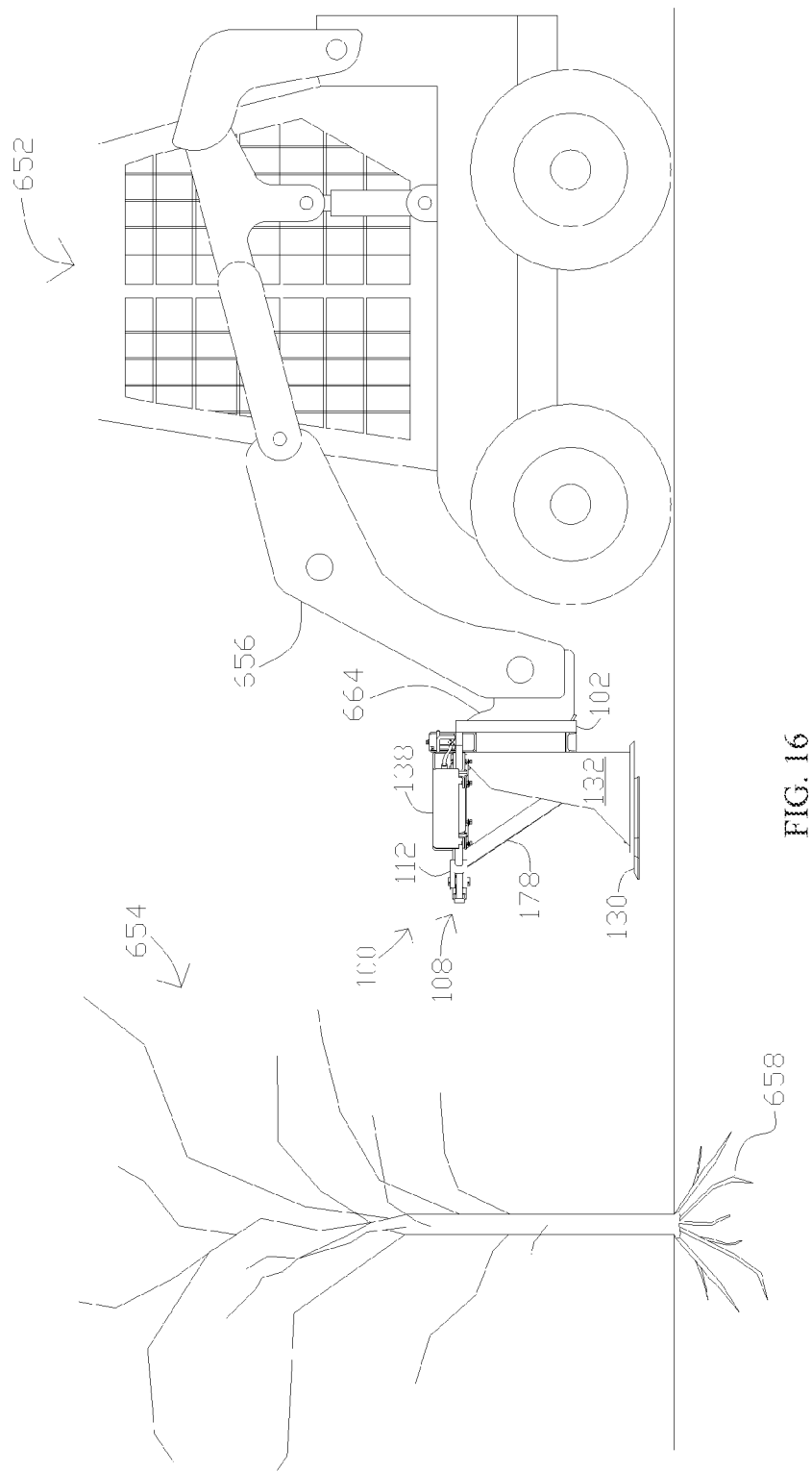
FIG. 16 illustrates a second step in an exemplary method of using the embodiment of FIG. 1.
Figure 18:
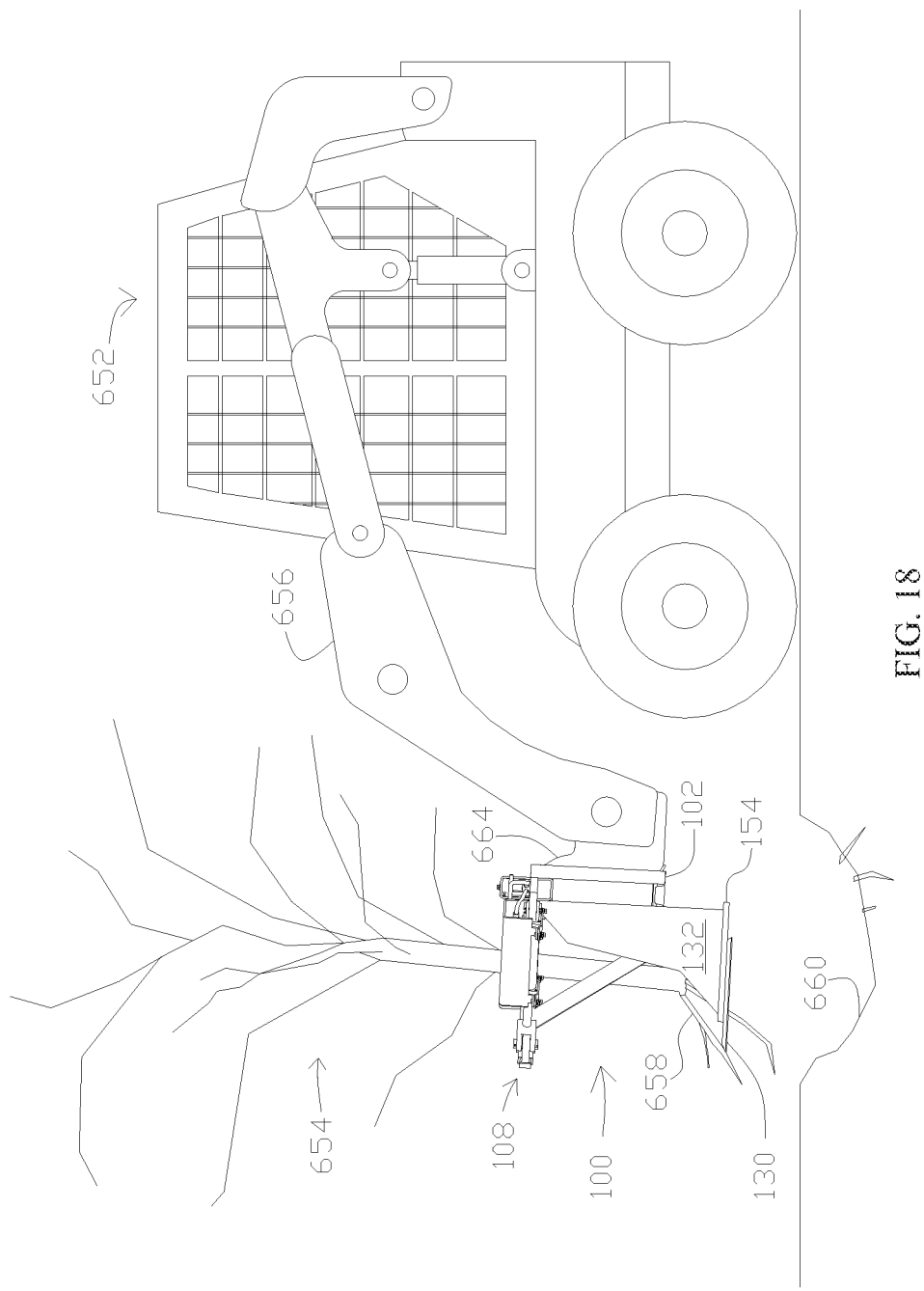
FIG. 18 illustrates a fourth step in an exemplary method of using the embodiment of FIG. 1.
Figure 19:
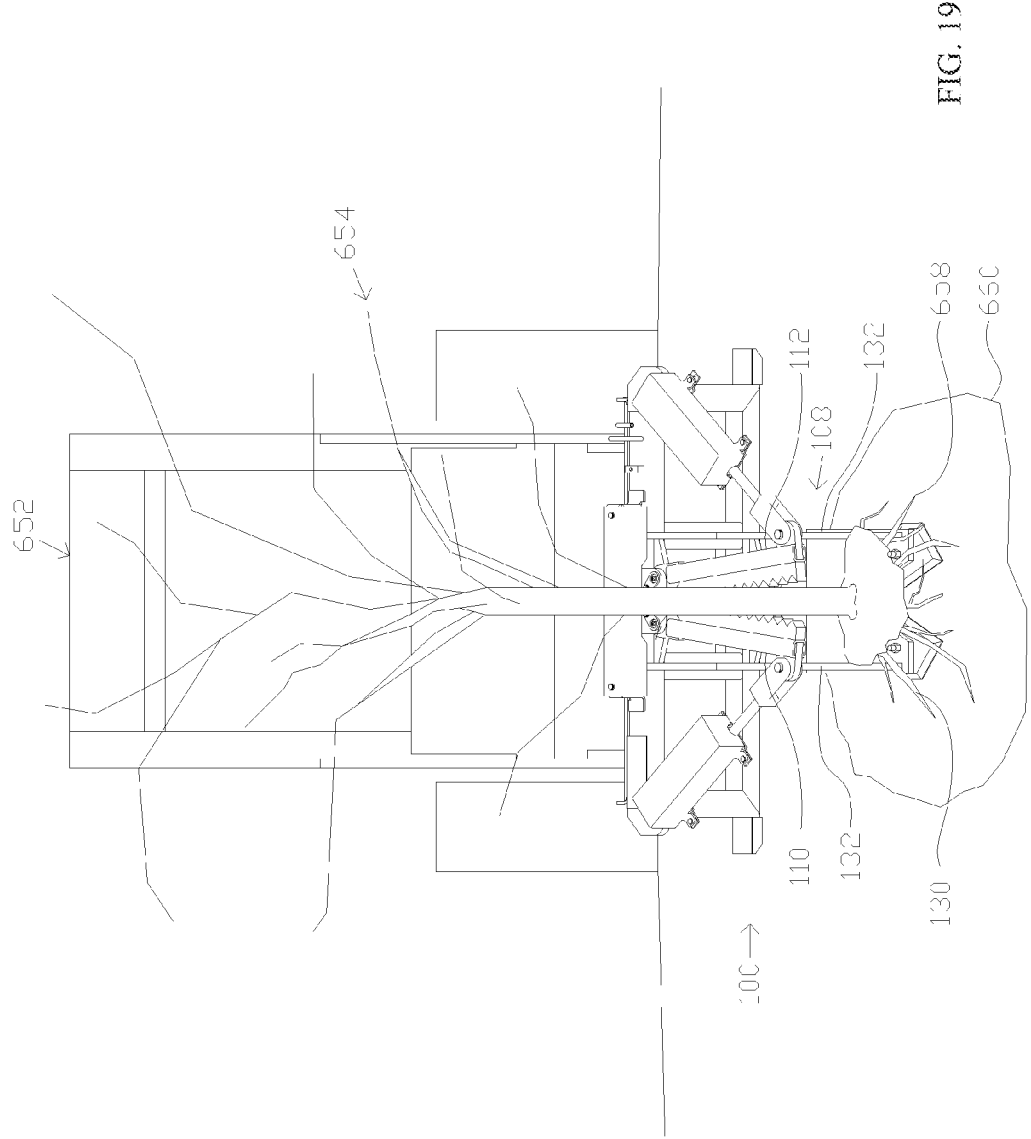
FIG. 19 illustrates a front view of the fourth step illustrated in FIG. 18.
Figure 20:
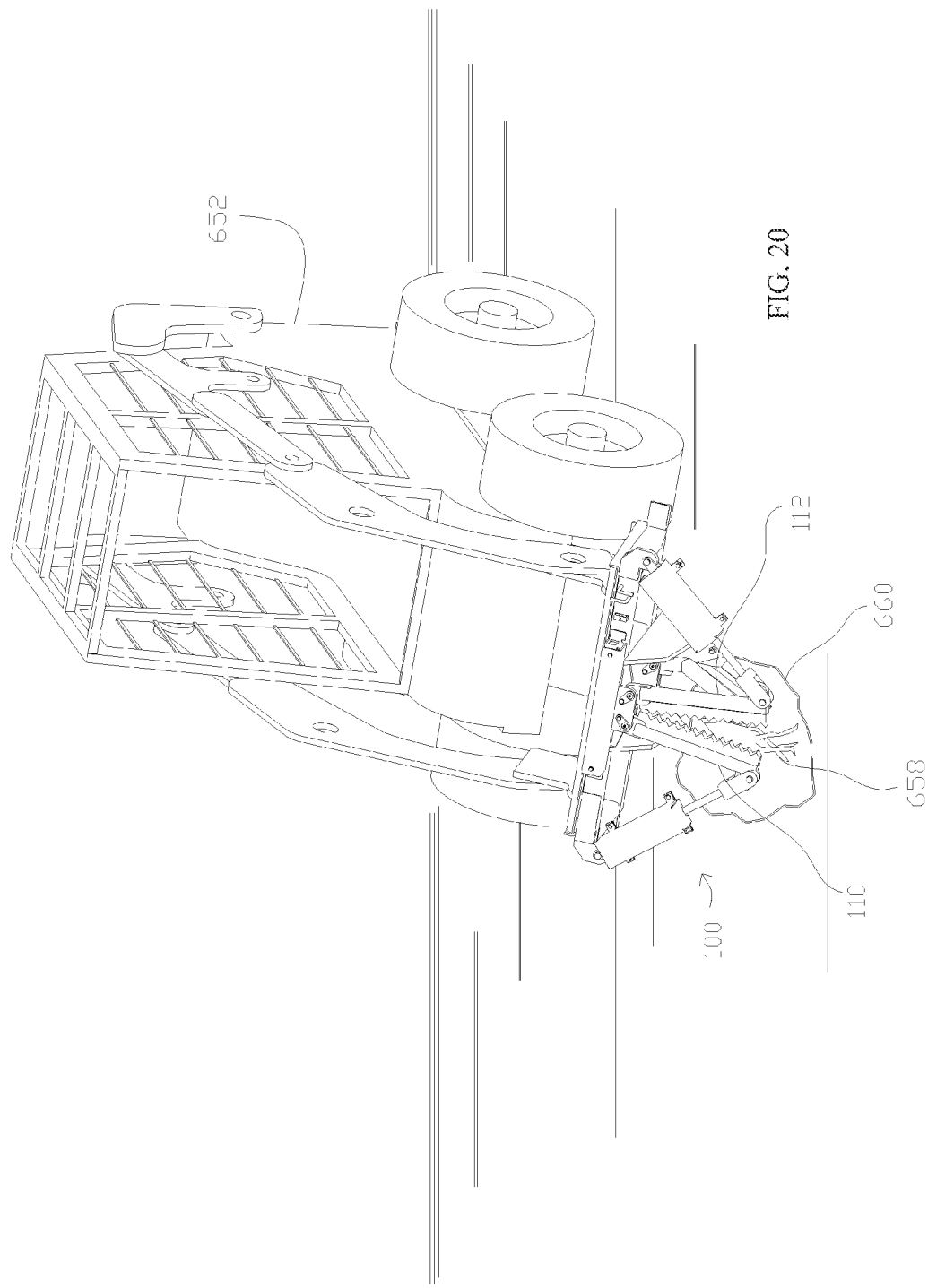
FIG. 20 illustrates a fifth step in an exemplary method of using the embodiment of FIG. 1.

The grubbing attachment 100 may be removably secured to the skid steer loader 652 or other heavy machine and connected to a hydraulic power source (not shown). The hydraulic power source may be the main hydraulic system of the skid steer loader 652 or may be an auxiliary hydraulic power source on or near the skid steer loader 652 or the grubbing attachment 100. When in use, the skid steer loader 652 may be moved near the mesquite tree 654 and positioned such that the mesquite tree 654 is near the grubbing attachment 100, as shown in FIG. 16. The grubbing attachment 100 may be raised above the ground with the blades 130 angled downwardly toward the ground one or two feet in advance of the mesquite tree 654. The hydraulics-powered pincer 108 may be in the open position, e.g., the pincer jaws 110, 112 may be spread apart. The skid steer loader operator may drive the skid steer loader 652 towards the mesquite tree 654 while lowering the blades 130 to penetrate the ground at an angle sufficient to drive the blades 130 below all or part of the roots 658 of the mesquite tree 654, as shown in FIG. 17. In some embodiments, when the blades 130 are positioned into or beneath the roots 658 of the mesquite tree 654, the pincer jaws 110, 112 may be in position for grasping an above-ground portion of the mesquite tree 654. After the blades 130 are driven into or below all or part of the roots 658 of the mesquite tree 654, a skid steer loader operator may operate the skid steer loader's hydraulic system to power the hydraulic pistons 124 which may close the pincer jaws 110, 112 about the mesquite tree 654. The skid steer loader operator may operate the grubbing attachment 100 and/or the skid steer loader 652 to lift the blades 130 out of the ground by tilting the frame 102 back to a position in which the frame 102 is generally perpendicular to the ground, as seen in FIGS. 18 and 19. As seen in FIGS. 18 and 19, the operator may use the skid steer loader's hydraulic system to lift the loader arms 656 and grubbing attachment 100 away from the ground while still grasping the mesquite tree 654. As shown in FIGS. 18 and 19, the mesquite tree 654 may be clamped between pincer jaw 110 and pincer jaw 112. A portion of roots 658 may be cut by blade 130 while a portion of roots 658 may also be located above blade 130 and held by blade 130, as shown in FIGS. 19 and 20. The operator may shake dirt from the roots 658 by operating the skid steer loader's loading arm 656 control. The operator may then drive the skid steer loader 652 to a brush pile and release the uprooted mesquite tree 654 onto the pile by opening the pincer jaws 110, 112 and shaking the grubbing attachment 100.

Additionally, the operator may use the blades 130 or backblade 154 to fill in the hole 660 left by the roots 658, such as by scraping into the hole 660 dirt shaken loose from the roots 658. The flat underside of the blades 130 may be used to further smooth the ground. For very short vegetation, the blades 130 may be used alone without the need for the hydraulics-powered pincer 108. Likewise, for vegetation known to have shallow root systems, the hydraulics-powered pincers 108 alone may be used to uproot the vegetation.

As shown in FIG. 20, the operator may use the pincer jaws 110, 112 to remove any remaining roots 658, such as a tap root. The pincer jaws 110, 112 may be positioned within hole 660 and pincer jaws 110, 112 may be clamped onto roots 658. The pincer jaws 110, 112 may then be removed from the hole 660 with the roots 658 still clamped within the pincer jaws 110, 112. In some embodiments, pincer jaws 110, 112 may be positioned within hole 660 so that hydraulic pistons 124 and hydraulic covers 138 do not contact hole 660 or the ground around hole 660. Removing a majority of the roots 658 may help to insure that the unwanted vegetation does not grow back from the remaining root material, as is often the case with perennial vegetation, after the majority of the unwanted vegetation has been removed, requiring either that harmful chemicals be used to kill remaining root material or that re-growth caused by the root material be removed again when the unwanted vegetation re-grows. Therefore, the grubbing attachment may allow for the removal of perennial vegetation without the use of harmful chemicals and without the need to remove the same perennial vegetation several times.

Figure 21:
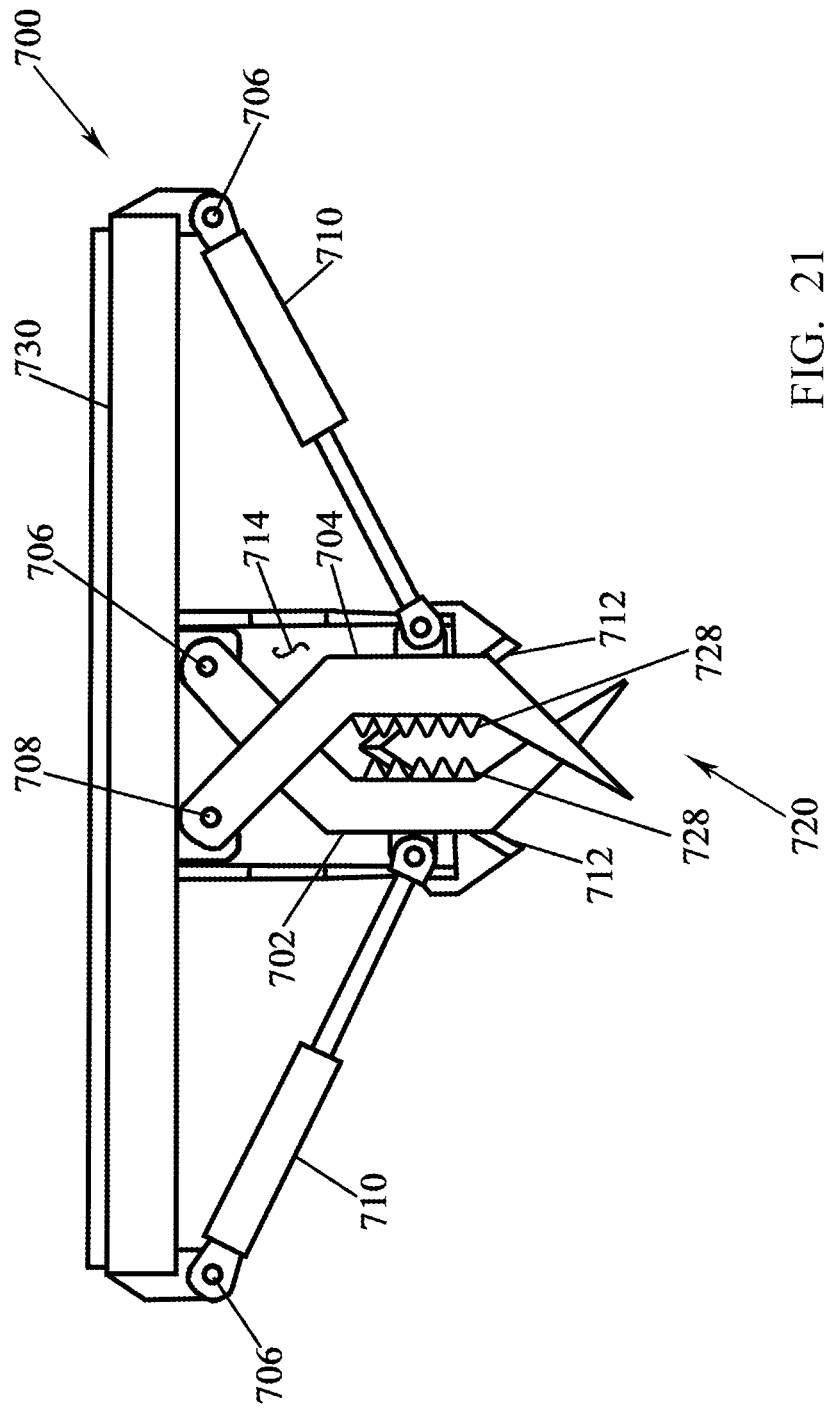
FIG. 21 illustrates a top view of pincer arms mounted to an exemplary frame.
Figure 22:
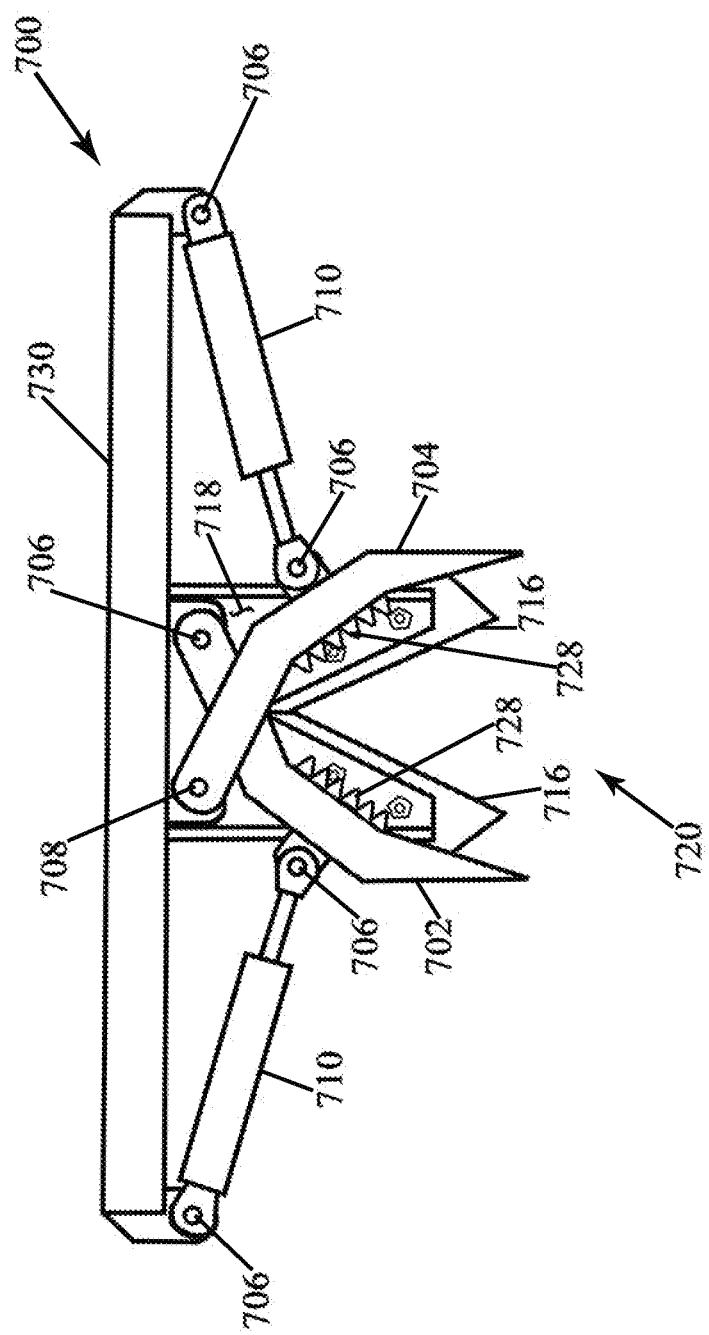
FIG. 22 illustrates a top view of the embodiment of FIG. 21, wherein the pincer arms are in an open position.
Figure 23:
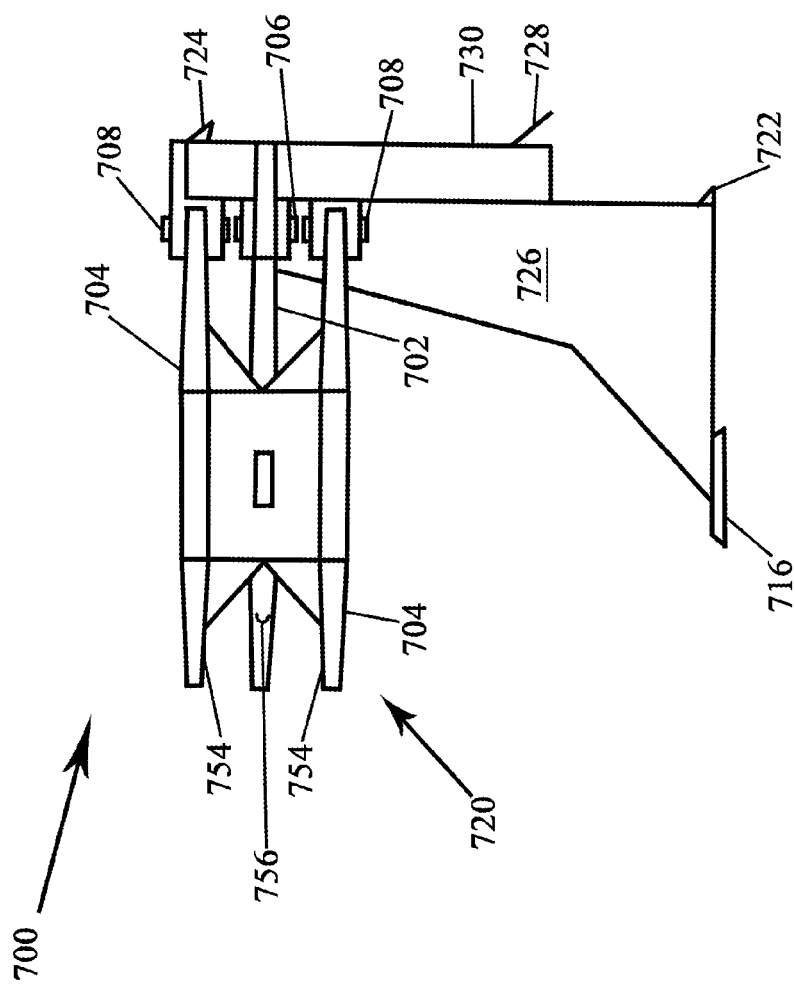
FIG. 23 illustrates a right side view of the embodiment of FIG. 21.

FIGS. 21-23 show another embodiment of a grubbing attachment 700. FIG. 21 provides a top view of one embodiment of pincer jaws 702, 704 attached to an exemplary frame 730. As shown in FIG. 21, the non-straight pincer jaws 702, 704 may be mounted on opposing pivot points 706, 708, respectively. Each pincer jaw 702, 704 may comprise one or more straight or curved edges. In some embodiments, the pincer jaws 702, 704 may be curved to allow the pincer 720 to grasp more material, such as a wider piece of vegetation. As shown in FIG. 22, when the pincer jaws 702, 704 are in the open position a greater distance exists between pincer jaws 702, 704. Each pincer jaw 702, 704 may be mounted to a pivot point 706, 708 such that the pincer jaws 702, 704 cross over each other, as shown in FIG. 22. Each pincer jaw 702, 704 may be actuated by a hydraulic piston 710. Each pincer jaw 702, 704 may be provided with one or more teeth 728 for increased gripping surface. The pincer jaws 702, 704 in the embodiment of FIG. 21 are shown in a closed position while the pincer jaws 702, 704 in the embodiment of FIG. 22 are shown in the open position.

The blades 712 may be attached to base plate 714 such that blades 712 protrude from the sides of base plate 714, as shown in FIGS. 21 and 22. In some embodiments, the base plate 714 may be configured such that several different sizes and configurations of blades 712 may be attached thereto.

FIG. 23 provides a right side view of the embodiment of FIGS. 21 and 22. The pincer jaw 704 may include two spaced-apart edges 754 pivotably mounted to the frame 730 at pivot points 708. The other pincer jaw 702 may include a single edge 756 pivotably mounted to the frame 730 at a pivot point 706. In the closed position, the single edge 756 may be located between the two spaced-apart edges 754. As in other embodiments, a leg 726 may be mounted to the frame 730, and one or more blades 716 may be mounted to the leg 726. As shown in FIG. 24, the leg 726 may include a back blade 722 and a blade 716. Frame 730 may include a lip 724 configured to attach to a piece of heavy equipment. Lip 728 may also be configured to attach to a piece of heavy equipment.

FIG. 24 provides a rear view of another embodiment of a grubbing attachment frame 804. The frame 800 may include steps 814 and legs 816. Legs 816 may be attached to the base plate 818. In this embodiment, the hydraulic hoses 802 may be partially positioned within the frame 804. Each hydraulic hose 802 may be connected at a first end 806 to a hydraulic piston 808, and at a second end 820 to a hydraulic system fitting 810, such as a male JIC 6 hydraulic fitting. Additional hoses (not shown) may connect the hydraulic system fitting 810 with another fitting, such as a quick-connect fitting (not shown), which may connect with the hydraulic power source. Additional hoses and fittings may be used to vary the length and path of pressurized fluid from the hydraulic power source to pistons 808. Thus, any number and arrangement of hydraulic hoses 802 may connect a hydraulic power source to the grubbing attachment's hydraulic pistons 808. The hoses 802 may pass through the frame 804 and up into an upper enclosure 812. The frame 804 may include apertures (not shown) to allow the hoses 802 to pass from the hydraulic pistons 808, through the frame 804, and out of the frame 804 (through the apertures) for connection to the machine's hydraulic system (not shown). Routing the hoses 802 through the frame 804 in this manner may provide better protection of the hoses 802 from puncture and abrasion.

Figure 25C:
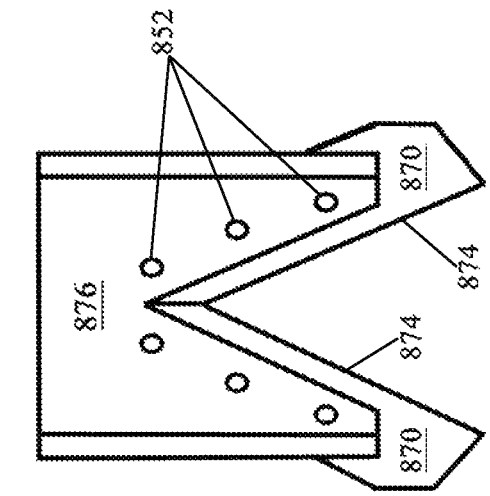
FIG. 25A-C illustrate various exemplary blade configurations.
Figure 25B:
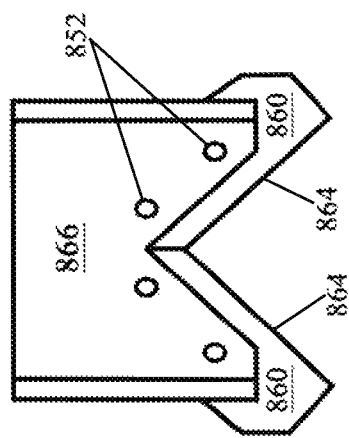
Figure 25A:
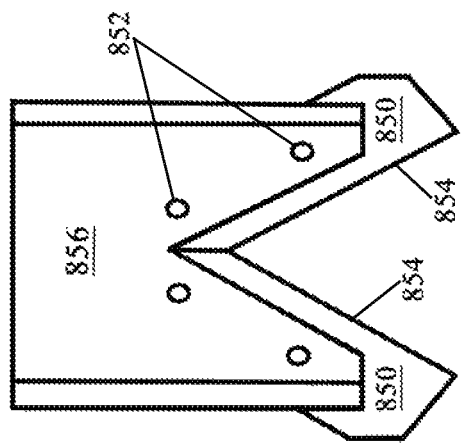

FIGS. 25A-C illustrate various embodiments of blades 850, 860, 870 and various embodiments of 'V' angles between blades 850, 860, 870. The blades 850, 860, 870 may be at any suitable angle and may be of any suitable length, depending on the composition of the earth and typical root size of the plants found in the terrain in which the grubbing attachment is used. The blades 850, 860, 870 may be removably mounted to the base plate 856, 866, 876 by means of bolts 852 to allow ready removal of the blades 850, 860, 870 for sharpening, repair or replacement, or may be permanently fixed to the base plate 856, 866, 876. The blades 850, 860, 870 may comprise straight edges 854, 864, 874 (as shown), or may be curved to enhance cutting. The blades 850, 860, 870 may also include a combination of jagged and straight edges 854, 864, 874 depending on the particular use of the grubbing attachment. The tips of the blades 850, 860, 870 may be pointed, or may be blunted to avoid puncturing or gouging underground objects, such as pipelines, wooden pilings or concrete footings. In other embodiments, the angle between the blades 850, 860, 870 may be between 23 degrees and 120 degrees. In some embodiments, the angle between the blades 850, 860, 870 may be between 35 degrees and 90 degrees. In some embodiments, a single blade may be attached to the base plate 856, 866, 876 and may be in the shape of, for example, a typical spade. In another embodiment, a single blade without a "V" shaped cutaway section may be attached to the base plate 856, 866, 876. In some embodiment, the base plate 856, 866, 876 may be rectangular, square or any other suitable shape.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition, or matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods or steps.

What is claimed is:

1. A skidsteer loader grubbing attachment, the attachment comprising,
    a frame configured for removable attachment to a skidsteer loader having a hydraulic power source;
    a pincer comprising two substantially straight pincer jaws, each pincer jaw pivotably mounted to and extending substantially perpendicularly in a common pivot plane from the frame, the pincer jaws pivotable toward each other to a substantially parallel and adjacent position so as to allow the jaws to grasp vegetation along their length;
    two hydraulic pistons each configured for connection to and actuation by the hydraulic power source, one hydraulic piston being pivotably mounted to the frame and to one pincer jaw, the other hydraulic piston being pivotably mounted to the frame and to the other pincer jaw;
    a first leg having a first end and a second end, the first end of the first leg being mounted to the frame;
    a second leg having a first end and a second end, the first end of the second leg being mounted to the frame;
    a base plate mounted to the second end of the first leg and to the second end of the second leg; and
    a 'V'-shaped blade configured for substantially non-severing engagement with the vegetation, the blade mounted to the base plate such that the 'V' opens away from the frame and is directly below the pincer when the pincer is horizontally oriented, the base plate and blade being in a fixed position with respect to the pincer and sufficiently distant from the pincer to allow the blade to engage the vegetation below ground level without contacting the pincer with the ground, and the pincer arms being of sufficient length to grasp vegetation below ground level when the frame is tilted forward by a skidsteer.

2. The attachment of claim 1, the blade comprising a first blade and a second blade oriented to form the 'V.'

3. The attachment of claim 1 wherein the pincer jaws comprise teeth.

4. The attachment of claim 1, further comprising a backblade mounted to the base plate opposite the blade.

5. The attachment of claim 1 wherein each pincer jaw further comprises at least one brace configured to resist twisting forces.

6. The attachment of claim 1, wherein the first leg, second leg and base plate comprise a grubbing bucket removably mounted to the frame.

7. A method for removing vegetation from the ground, the method comprising:
    mounting the grubbing attachment of claim 1 to a skid steer loader;
    urging the blade into the ground near the vegetation such that the blade engages one or more roots of the vegetation;
    closing the pincer jaws about all or part of an above-ground part of the vegetation; and
    lifting and tilting the blade out of the ground so as to remove at least part of the vegetation from the ground.

* * * * *